United States Patent [19]

Morgera

[11] 4,207,620
[45] Jun. 10, 1980

[54] OCEANOGRAPHIC MAPPING SYSTEM

[75] Inventor: Salvatore D. Morgera, Warwick, R.I.

[73] Assignee: Raytheon Company, Lexington, Mass.

[21] Appl. No.: 509,624

[22] Filed: Sep. 26, 1974

[51] Int. Cl.² ............................ G01S 9/68; G01S 7/60
[52] U.S. Cl. ........................................ 367/88; 367/92; 367/97; 367/100; 367/103; 367/108; 367/115; 343/100 CL
[58] Field of Search .......... 343/100 CL, 5 PC, 5 CM; 340/3 M, 3 R, 3 F, 15.5 TA

[56] References Cited

U.S. PATENT DOCUMENTS

| | | | |
|---|---|---|---|
| 2,800,654 | 7/1957 | DeRosa | 343/100 CL |
| 3,096,482 | 7/1963 | Frank et al. | 343/100 CL |
| 3,419,867 | 12/1968 | Pifer | 343/100 CL |
| 3,716,825 | 2/1973 | Walsh et al. | 340/5 CM |
| 3,723,952 | 3/1973 | Walsh | 340/3 R |

Primary Examiner—Richard A. Farley
Attorney, Agent, or Firm—M. D. Bartlett; J. D. Pannone; H. W. Arnold

[57] ABSTRACT

An underwater mapping system in which a swath of terrain, much wider than a sonar beam width, is observed by means of a sonar beam scanned in the cross track plane of a ship. Filtering and correlation techniques are employed to compensate for distortions in echoes emanating from the ocean bottom by a selection of filter coefficients in accordance with the orientation of the sonar beams and by providing a simulated echo envelope for correlation.

37 Claims, 14 Drawing Figures

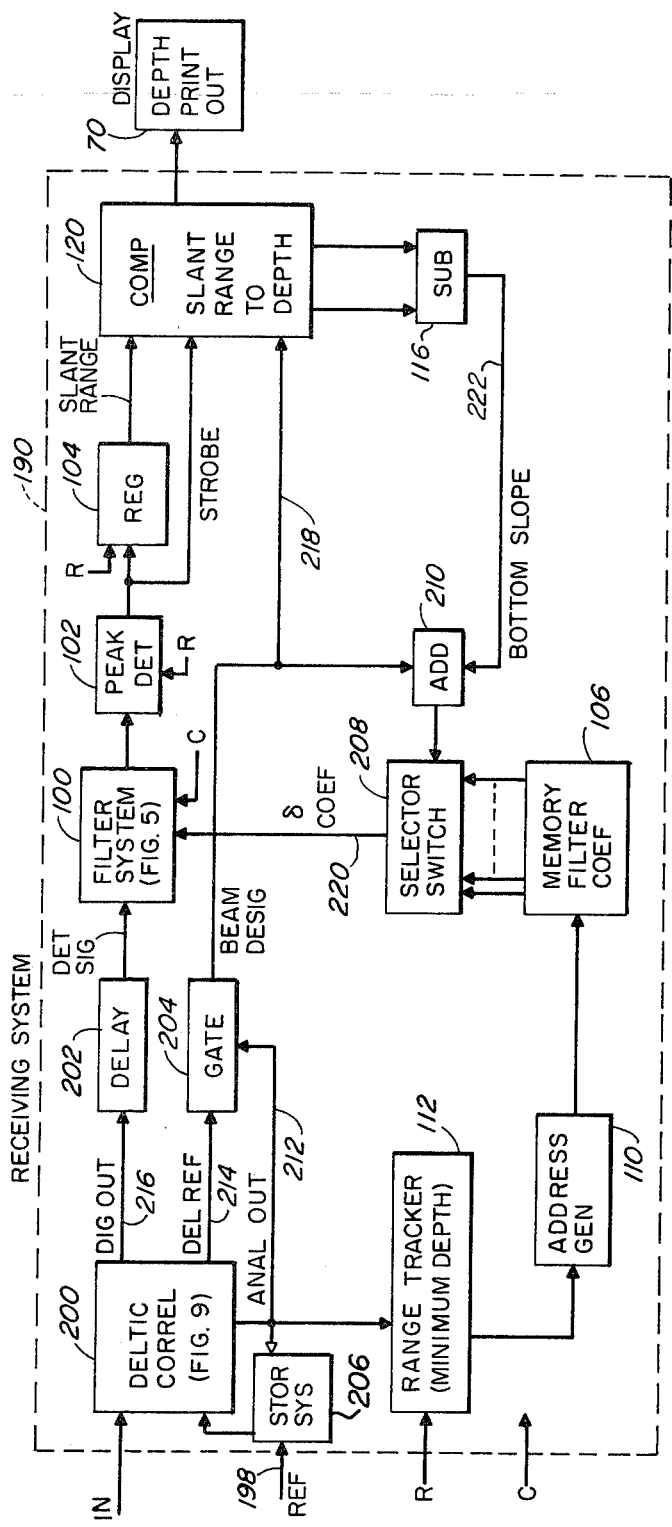
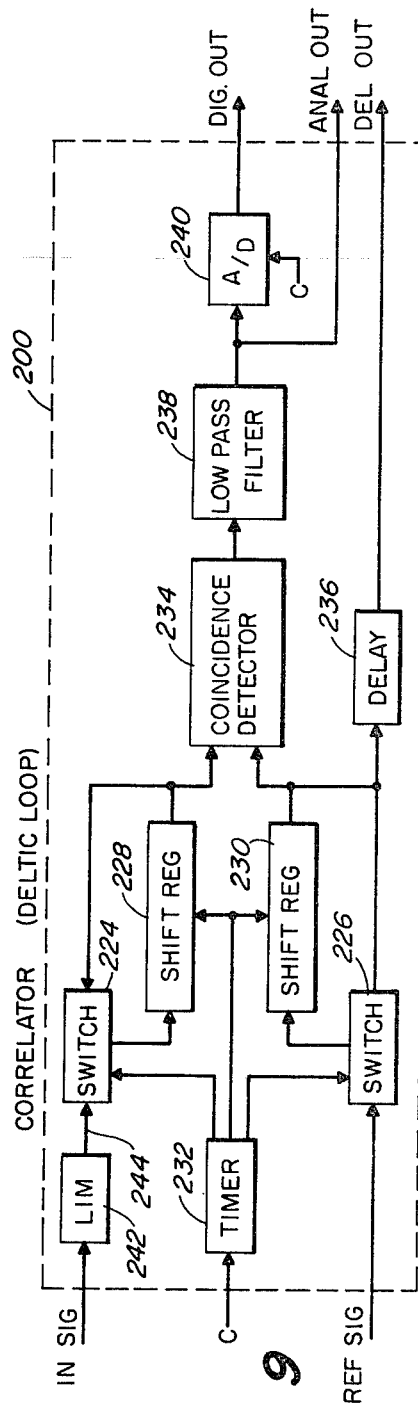
FIG. 8
FIG. 9

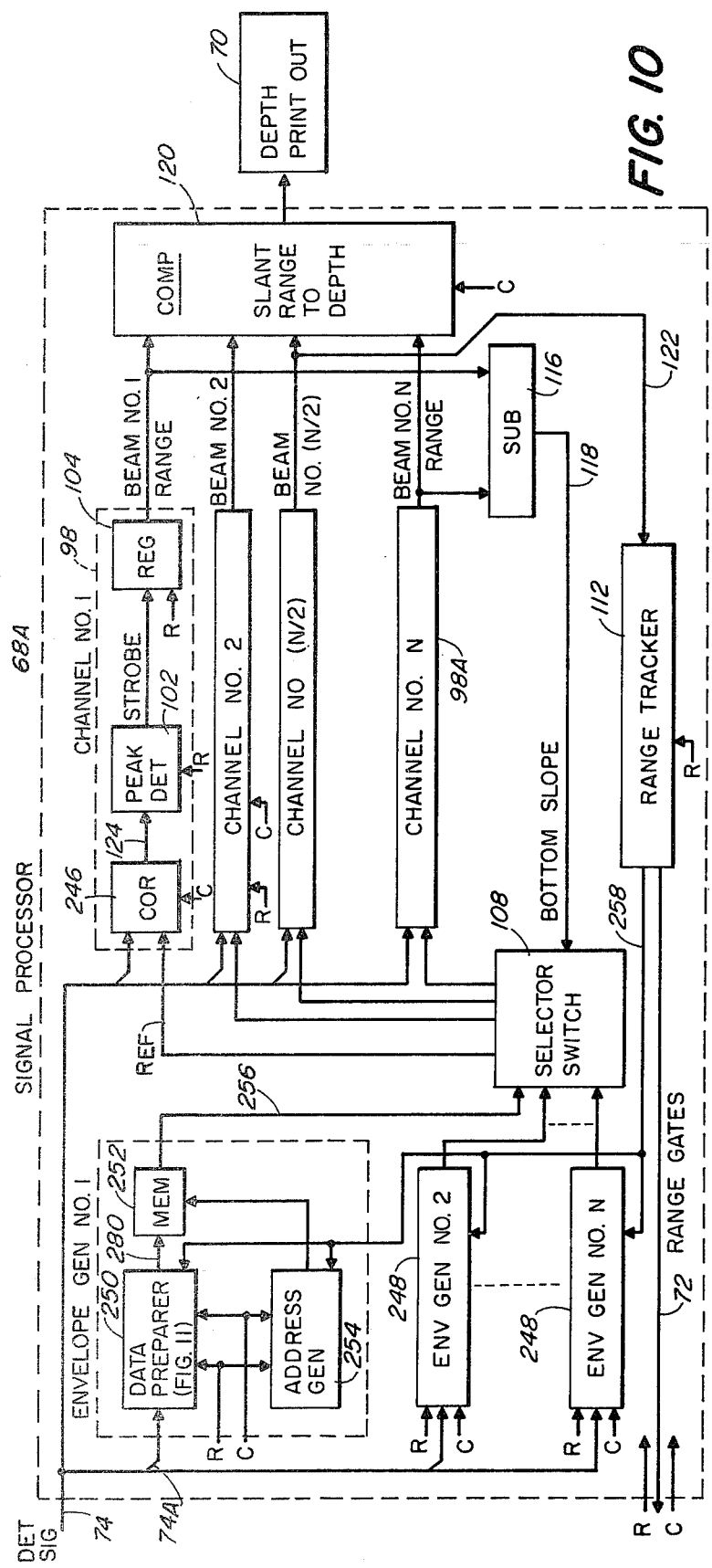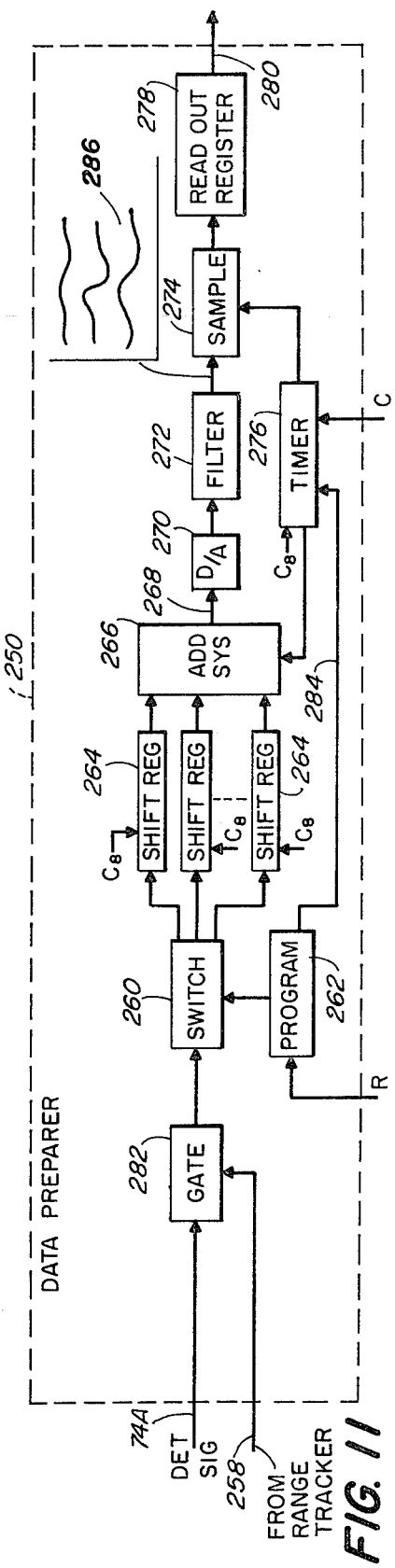

FIG. 12

OCEANOGRAPHIC MAPPING SYSTEM

BACKGROUND OF THE INVENTION

Mapping of the ocean bottom is carried on by means of ships utilizing depth sounding equipment. Such equipment is limited in that it only views the ocean bottom along the track of the ship in the vicinity or area directly beneath the ship. It is advantageous to utilize side looking sonar equipment to provide further coverage along both sides of the surveying ship, thereby to minimize the number of passes that a ship must make over a terrain to complete the mapping. A problem arises in the utilization of such side looking sonar equipment in that the sonar beams are directed at an angle to the vertical plane and thus intercept the ocean bottom at an angle thereby ensonifying a much larger and extended area of the ocean bottom by obliquely oriented beams than the area ensonified by a beam directed downwardly from the ship. These elongated ensonified regions provide an elongated echo of varying intensity which masks the true slant range between the ship and a point of reflection from the ocean bottom. Thus, measurements of ocean depth based on slant range measurements obtained by obliquely oriented sonar beams tend to be less accurate than those obtained from a depth sounder having its beam directed in the vertical plane at a point directly beneath the ship.

SUMMARY OF THE INVENTION

The aforementioned problems are overcome and other advantages are provided by a sonar mapping system of underwater terrain in which sonar equipment carried on board a ship provides a scanned beam in a cross track or athwartships plane, the plane perpendicular to the direction of travel of the ship, for obtaining data from echoes reflected from the sea bottom on both sides of the ship as well as directly beneath the ship. The data obtained from the several beams is separately accumulated to provide individual range measurements corresponding to echoes received on each of the sonar beams. The signals received for each of the sonar beams are separately processed by a filtering technique in which a digital filter is employed to correct for the effects of distortion in the envelopes of these signals which is caused by the glancing angles of reflection from the sea bottom. The impulse response of the digital filter utilized in processing the data or signal obtained from a specific sonar beam is the mirror image of the anticipated envelope of the reflected signal, thereby providing a matched filtering operation which replaces the elongated echo with a relatively narrow pulse at the output of the digital filter. In an alternative embodiment of the invention there is disclosed a generator of the anticipated echo envelope and a correlator for correlating the anticipated envelope with the received signal to similarly provide a narrow pulse output in response to the elongated distorted echo. The teachings of this embodiment may also be utilized in mappings of other media such as a geological survey in which case the sonar transducers would be replaced with seismic thumpers. In a preferred embodiment of the invention the digital filter is provided with a recirculating loop to function as a recursive filter having a multiple pole impulse response. A memory is provided for storing a set of filter coefficients for each of the filters of each of the sonar beams to provide individual filter characteristics both as a function of the sonar beam orientation and the depth of the ocean to provide precise compensation in accordance with the actual length of the received echo.

BRIEF DESCRIPTION OF THE DRAWINGS

The aforementioned aspects and other features of the invention are described in accordance with the accompanying drawings wherein:

FIG. 7 is a block diagram of an alternative embodiment of the system of FIG. 2 in which a finite amplitude sonar system ensonifies the ocean water, the scanned beam being provided on transmission rather than on reception as was disclosed with reference to the embodiment of FIG. 2;

FIG. 8 shows a block diagram of a receiving system utilized in the system of FIG. 7, the receiving system of FIG. 8 employing a deltic correlator to identify the signal returns of the several sonar beams as they are applied to the filter system (disclosed in FIG. 5) to compensate for echo envelope distortion in accordance with the invention;

FIG. 9 is a block diagram of the deltic correlator of FIG. 8;

FIG. 10 is an alternative embodiment of a signal processor for use in the system of FIG. 2, this signal processor employing a correlator for correlating the received echo with the anticipated echo replica to correct for echo envelope distortion in accordance with the invention;

FIG. 11 is a block diagram of a data preparer of the signal processor of FIG. 10, the data preparer including registers for the storage of previous echo histories from which is generated an anticipated reference replica;

FIG. 12 shows a block diagram of a variable digital delay for use in the beam forming operation of FIG. 2, this alternative embodiment including complex digital sampling of the received signal by inphase and quadrature samplers;

DESCRIPTION OF THE PREFERRED EMBODIMENT

Figure 1:
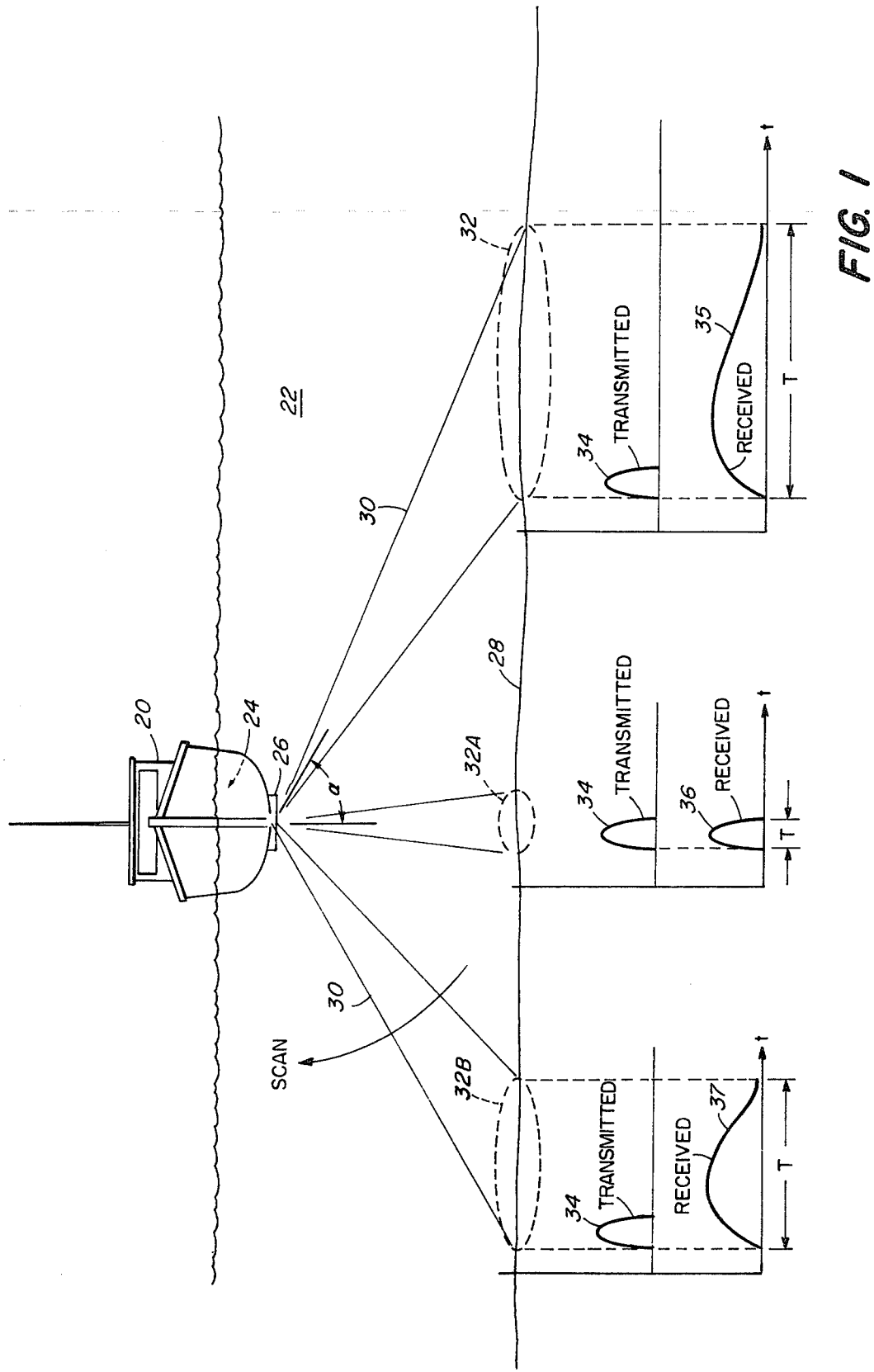
FIG. 1 is a stylized pictorial view of a ship having a sonar array of transducers for scanning beams in accordance with the invention, the figure showing the elliptically shaped regions upon the sea bottom with individual graphs portraying the transmitted pulse and the distorted and elongated echo reflected from the elongated elliptically shaped regions of the sea bottom.

Referring now to FIG. 1, there is seen a ship 20 sailing on the ocean 22 and carrying a sonar system 24 which embodies the invention and includes a sonar transducer array 26 attached to the bottom of the ship 20. The system 24 is being utilized in the mapping of the sea bottom 28. The figure shows an end view of the ship 20 with sonar beams 30 being directed athwartships. As will be seen more fully in FIG. 2, the array 26 provides for the transmission of a fan beam to illuminate the bottom 28 and comprises a receiving beam former for receiving energy reflected from the bottom 28 in a plurality of the beams 30. The beams 30 provide slant range echo data over a swath of the bottom 28 which is much wider than that which could be illuminated by a single beam of sonic energy directed downwardly from the ship 20 as is the case with conventional depth sounding equipment.

In an alternative embodiment of the system to be described subsequently in FIG. 7 and identified therein by the legend 24A, the beams 30 represent transmitted beams of radiant energy, the system 24A having a fan shaped receiving beam pattern in the athwartships direction.

Since each beam 30 is presumed to have a generally conical shape as measured, for example, from the 3 dB (decibels) or 6 db points, and intersects the sea bottom 28 which, as shown in FIG. 1, is presumed to be generally flat, the surface of intersection having a generally elliptical shape. For oblique angles of intersection of the beam 30 with the bottom 28, the elliptically shaped intersection such as that labeled 32 is greatly elongated and has a greater intensity of sound at the end of the region 32 nearer the ship 20 than at the end of the region 32 away from the ship 20. As a result, a relatively short burst of transmitted sonic energy, frequently referred to as a ping, is reflected at differing times from differing parts of the region 32 with a consequent elongation of the received echo.

Beneath the region 32 and other such regions labeled 32A and 32B there are provided graphs showing the transmitted pings 34 and the resulting received echoes 35-37. The echo 36 emanating from the region 32A is seen to have a shape substantially the same as that of the transmitted ping 34. However, the received echo 35 emanating from the region 32 is seen to be greatly elongated, having a duration of T seconds and reaching a maximum intensity shortly after the leading edge of the echo with a gradually trailing off intensity at the tail of the echo 35. Similar comments apply to the received echo 37. As will be seen subsequently, the system 24 processes the envelopes of the received echoes 35-37 to provide a signal envelope having the shape of a sharp pulse which is ideally suited for making the slant range measurements along the center lines of each of the beams 30 between the transducer array 26 and the points of intersections of the beams 30 with the bottom 28. The slant ranges are then converted into depth measurements to provide a mapping of the depths of the various points of the bottom 28. The angle of orientation of each of the beams 30 with respect to the vertical is represented by the symbol $\alpha$.

Figure 2:
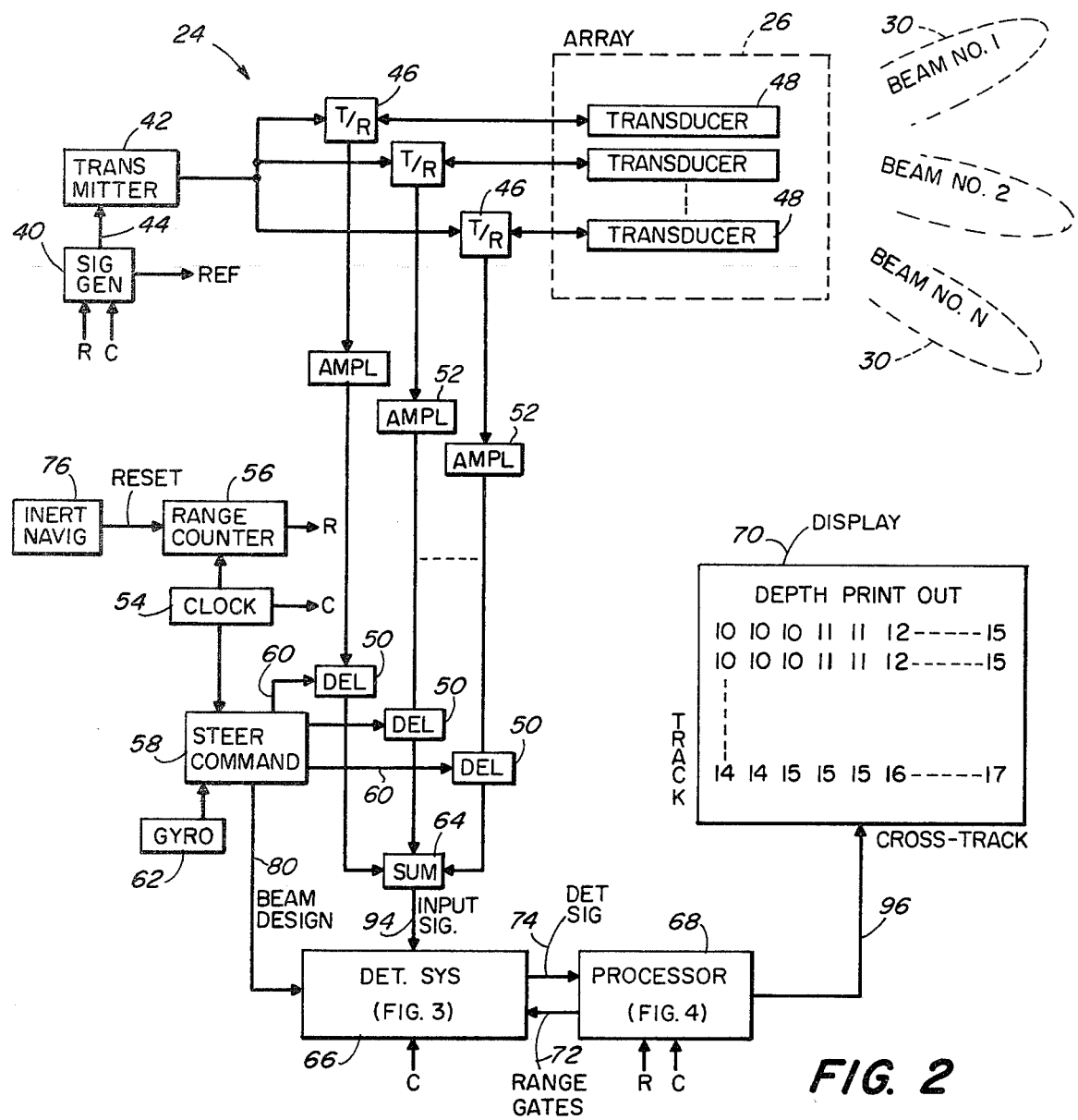
FIG. 2 shows a block diagram of a sonar system which, in accordance with the invention, energizes the transducer array of FIG. 1 and receives signals reflected thereto, the figure showing means for delaying the various signals to provide steered beams, and means for detecting the signals of the individual beams to provide for individual processing of the detected signals to provide a mapping of the ocean depth in accordance with the invention.

Referring now to FIG. 2, there is shown a block diagram of the system 24 which, in accordance with the invention, provides for the ensonifying of the ocean 22, receiving reflected energy in a plurality of beams, separately detecting the signals in each of the beams and correcting the envelopes of these signals to compensate for the distortion introduced by the oblique incidence of the sonic energy with the ocean bottom. The system 24 is seen to comprise a signal generator 40, a transmitter 42 coupled to an output of the signal generator via line 44, and transmit-receive circuits 46 for coupling the transmitter 42 to individual transducer elements 48 of the array 26. The transducer elements 48 are positioned in the array 26 for forming a beam of sonic radiation which fans outwardly in the athwartships direction so that such a radiation pattern is obtained simply by coupling each of the transducer elements 48 to the transmitter 42. The individual sonar beams 30 are formed upon reception of the reflected energy by means of delay units 50 coupled individually via amplifiers 52 and the transmit receive circuits 46 to the respective transducer elements 48. Each amplifier 52 includes a band-pass filter having pass band sufficiently wide to pass the spectral components of the received signal, but sufficiently narrow to exclude background noise. As is well known, the transmit receive circuits 46 protect the amplifiers 52 and the delay units 50 from the large amplitude of the transmitted signal while permitting receive signals to pass from the transducer elements 48 unimpeded to the amplifiers 52.

The system 24 further comprises a clock 54 for providing system timing signals represented by the letter C, a range counter 56 providing a multibit digital number representing range and indicated on the figure by the legend R, a steering command unit 58 which provides signals along line 60 for selecting the delays of the delay units 50, a gyroscope 62 attached to the ship 20 of FIG. 1 and responsive to its pitching, rolling and yawing to provide signals to the steering command unit 58 for stabilizing the radiation patterns of the array 26, a summer 64, a detector system 66, a signal processor 68 and a display 70. The summer 64 combines the delayed signals from the several transducer elements 48 to provide one of the receiving beams 30, individual ones of these beams being indicated in the figure by beam number 1, beam number 2, and beam number N where N may be 90 in the case where the beams fan out to an angle $\alpha$ of 45° on either side of the ship and each beam 30 has a beam width of 1°. (As a practical matter, for the above spatial coverage an odd number of beams, 91, would be utilized, the additional beam pointing directly down.) The detector system 66, which will be described in further detail with reference to FIG. 3, has means for segregating signal samples obtained from each of the beams 30 so that the various signal samples can be detected and combined into 90 separate detected signals in the case of 90 beams. The signal processor 68 which is coupled to the detector system 66 provides course range gates on line 72 for utilization by the detector system 66, and processes the detected signals on line 74 by separately filtering each of the signals, in a manner to be described with reference to FIG. 4, to compensate for the distortion shown in FIG. 1.

The display 70 is a computer print out of depth data obtained from the processor 68. A separate line of depth data is presented periodically as the ship 20 of FIG. 1 advances along its track. In this respect, it is presumed that the ship 20 is provided with an inertial navigator 76 or other device such as a ground speed Doppler unit so that the ship's position along its track is known, the inertial navigator 76 serving to adjust the pinging times in accordance with the speed with the ship along its track over the sea bottom 28. In each line of the display 70 there is provided a sequence depth measurement corresponding to data received on each of the beams 30, there being 90 such entires per line in the event that there are 90 such beams. The entries in each line represent the depth measurements athwarthships or in the cross track direction and thus present a mapping of a wide swath of the bottom 28, the swath being centered on the track of the ship 20.

In operation, therefore, the signal generator 40 generates a signal suitable for sonar pinging such as a pulsed frequency modulated signal. The clock 54 provides system timing signals one of which is applied to the range counter 56. The output signal, R, of the range counter 56 in addition to serving as a measurement of slant range in a manner to be described hereinafter with reference to FIG. 4, activates the signal generator 40. The inertial navigator 76 resets the range counter 56 so that the signal generator 40 is not activated until the ship 20 has been advanced a predetermined distance along its track. The output of the signal generator 40 is amplified to a suitable power level by the transmitter 42 and is then transmitted via the array 26 into the ocean 20 to reflect off of points of reflection on the bottom 28. The steering command unit 58 selects sets of delays for the delay units 50 to provide successive receiving beams in a manner analogous to that taught in the U.S. Pat. No. 3,370,267 which issued to H. J. Barry on Feb. 20, 1968. By successively forming each receiving beam 30, the steering command unit 58 in combination with the delay unit 50 essentially scans the sea bottom 28. The scanning rate is in excess of the nyquist rate of the signal on line 44, more than at a rate twice its bandwidth, so that the individual samples can be combined in the detector system 66 to provide a true reproduction (apart from distortion introduced by the ocean) of the signal on line 44. In addition, the rapid scanning produces the effect of simultaneously looking throughout the angle to $2\alpha$ of FIG. 1 at the swath of the sea bottom 28. Accurate slant ranges based on the round trip times of the echoes as obtained by means of the signal processor 68 which filters the detected signals with a matched filter, or, utilizes correlation techniques in an alternative embodiment to be disclosed with reference to FIG. 10. A computer within the processor 68 computes the depth for each of the slant range measurements, this depth being printed out on the display 70.

Figure 3:
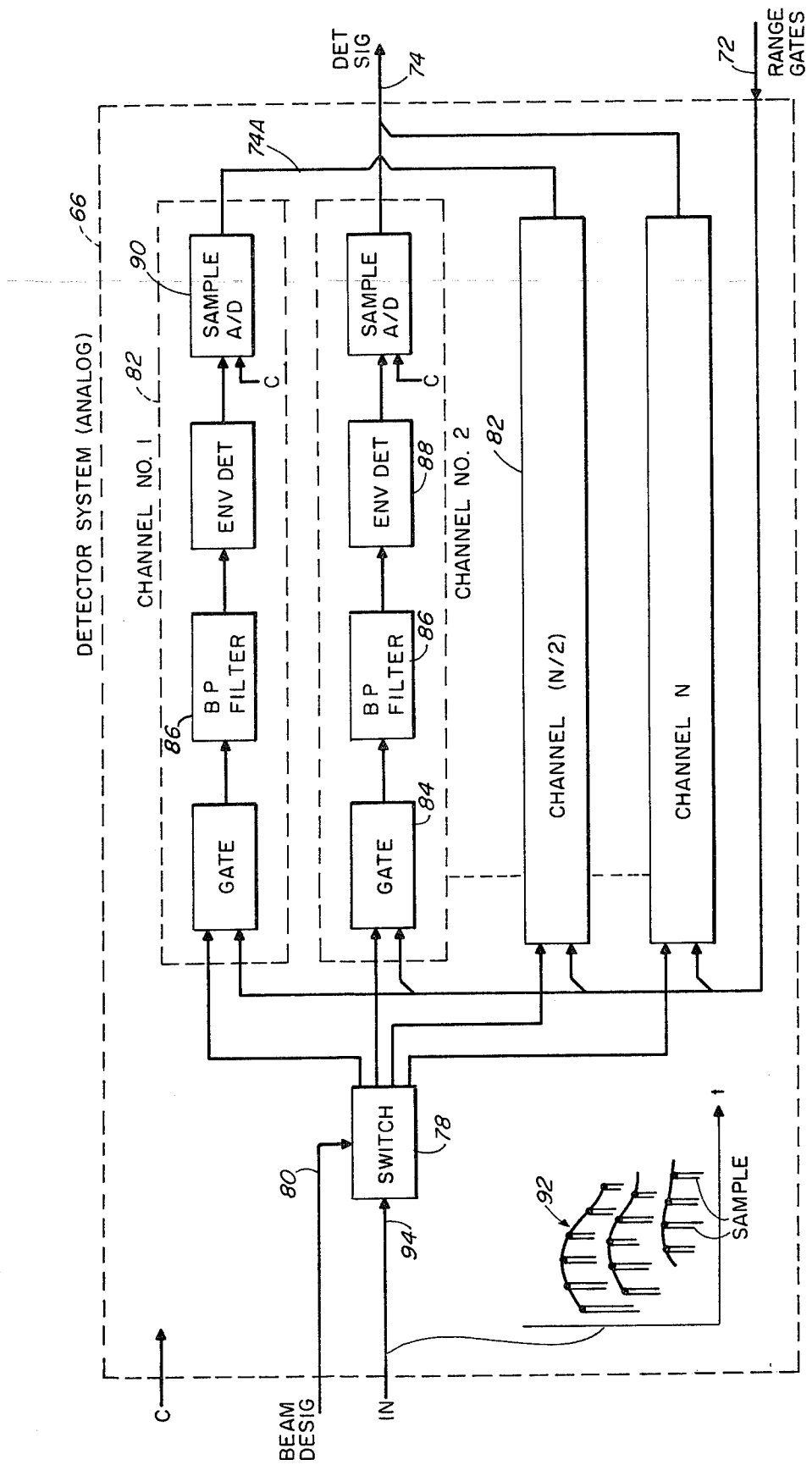
FIG. 3 is a block diagram of a detector system of FIG. 2.

Referring now to FIG. 3, there is seen a block diagram of the detector system 66. This embodiment of the detector system 66 operates with analogue signals; an alternative embodiment of a detector system utilizing digital sampling is disclosed in FIG. 13. The detector system 66 comprises a selector switch 78 operated by a beam designation signal on line 80 which is provided by the steering command unit 58 of FIG. 2, the beam designation signal being a digital number which identifies the particular beam being ordered by the steering command unit 58 thus, if at a given instant of time the thirty seventh beam is being produced, the beam designation signal contains the digital representation of the number 37. The detector system 66 further comprises a set of channels 82 each of which corresponds to one of the beams 30 of FIG. 2, each of the channels 82 comprising a gate 84, a band-pass filter 86, an envelope detector 88 and a sampling unit 90 which includes an analogue-to-digital converter for converting the analogue output of the envelope detector 88 to a multi-bit digital number suitable for use by the processor 68 of FIG. 2. Each of the gates 84 receives an individual range gate signal from individual conductors having an electric cable represented by line 72, the range gate signals being provided by the processor 68 for gating each of the gates 84 to conduct signals from the switch 80 to the respective filters 86 at such times as when an echo is anticipated. It is readily appreciated from examination of FIG. 2 that immediately after the transmission of the sonar signal by the transmitter 42, echoes from objects in the water as well as reverberations and reflections from thermoclines may be incident upon the array 26. The gates 84 serve the function of excluding these unwanted echoes from the filters 86.

In operation, therefore, as the beams 30 are each momentarily generated to provide effectively the scanning of the sea bottom 28. The effect of the scanning is portrayed in a graph 92 which shows how the signal on line 94 is composed of sequential pieces of the signals received on each of the beams 30 of FIG. 1. By way of example, three such signals are shown in the graph 92, the uppermost curve representing a signal of shorter range and greater amplitude while the bottom most curve represents a signal arriving from a greater slant range and at reduced amplitude. As the steering command unit 58 sequentially switches on each of the beams 30, relatively short duration samples of each signal are obtained at the output of the summer 64 of FIG. 2 and are coupled along 94 to the switch 78. The switch 78 is operated sequentially for each beam position so that all the samples of the upper curve of graph 92, for example, are placed in one of the channels 82 while the signal samples represented by the middle and lower curves of the graph 92 are placed in a second and a third of the channels 82.

It is noted that the delay units 50 of FIG. 2 may be analogue delay lines composed of an inductor-capacitor ladder network in which the values of the capacitance can be varied by the application of a voltage along line 60; thus, many cycles of the carrier frequency of the sonar may appear in each of the samples portrayed in the graph 92. However, as was mentioned hereinbefore, the rate of sampling is higher than twice the signal bandwidth so that the data of the signal is preserved.

Each of the filters 86 has a pass band sufficiently large to accommodate the signal band width but small enough to exclude the sampling frequency so that each filter 86 blends together the succession of signal samples in its channel 82 to reproduce the signal precisely, apart from a scale factor. The gain of the amplifiers 52 of FIG. 2 is sufficient to insure that the amplitudes of the signals passed by the filters 86 are large enough to permit envelope detection thereof by the detectors 88. The digital numbers representing the amplitudes of the detected signals are then coupled via an output cable, shown as line 74, to the processor 68.

Figure 4:
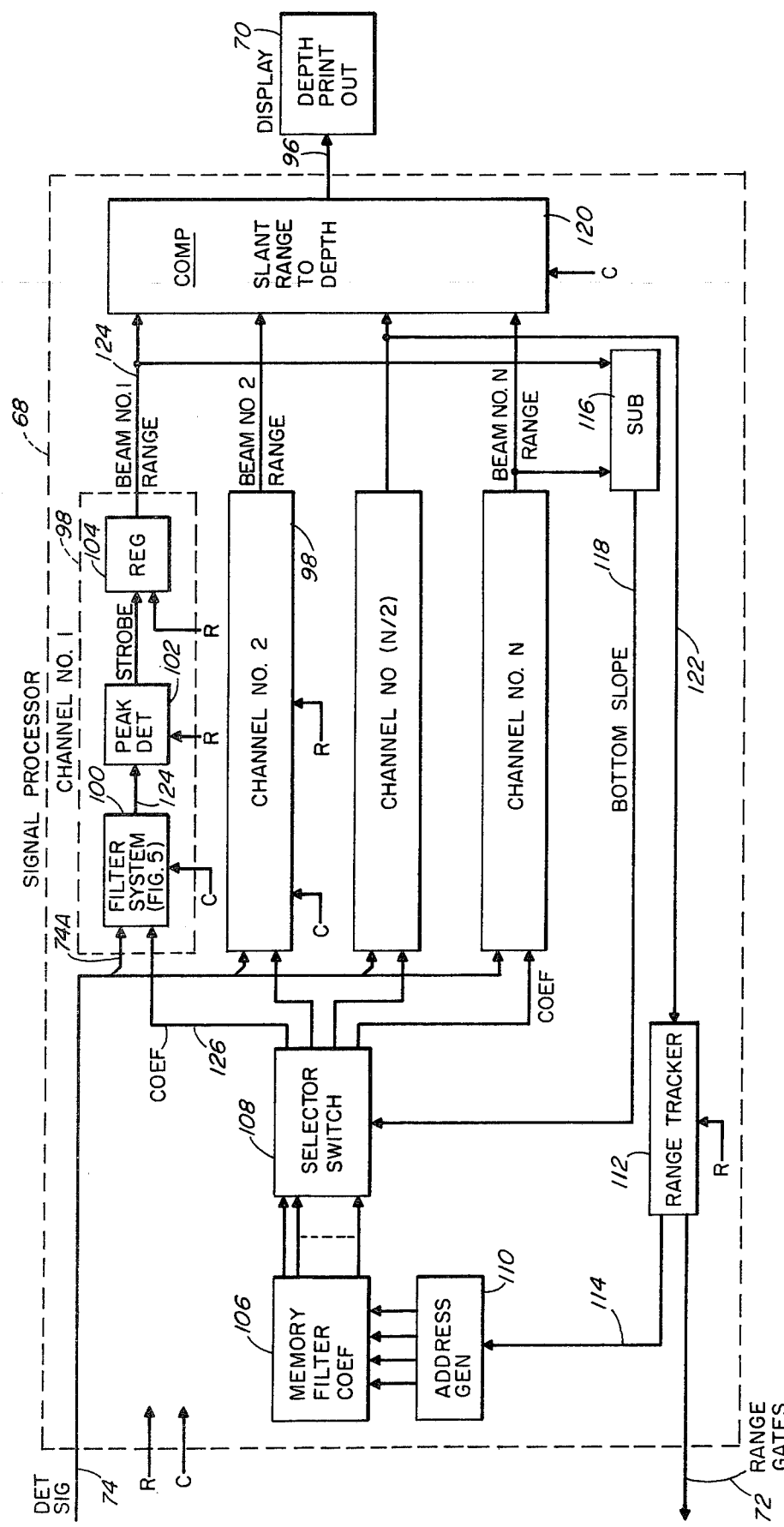
FIG. 4 is a block diagram of a signal processor of FIG. 2.

Referring now to FIG. 4 there is seen a block diagram of the signal processor 68. The signal processor accepts the detected signal on line 74, and provides the range gates on line 72 and the print out data on line 96 for the display 70. The signal processor 68 comprises a set of channels 98 equal in number to the channels 82 of FIG. 3. Each of the channels 98 comprises a filter system 100, a peak detector 102 and a register 104. The processor 68 further comprises a memory 106 for storing coefficients utilized by the filter systems 100, a selector switch 108 for selectively coupling output signals from the memory 106 to the several channels 98, an address generator 110, a range tracker 112 which provides the minimum slant range for depth of the ocean on line 114 for addressing the memory 106 to provide a set of filter coefficients corresponding to the depth of the ocean, a subtractor 116 which compares the slant ranges at a maximum angle $\alpha$ of FIG. 1 on each side of the ship 20 for determining the amount of bottom slope, a measure of the bottom slope appearing on line 118, and a computer 120 for calculating depth from slant range for each of the angles $\alpha$ of the respective beams 30 of FIG. 1. The filtering system 100 provides a matched filtering operation upon the detected signals arriving on line 74. The filter system 100 comprises a filter having an impulse response which has the same form as the envelope detected by the envelope detectors 88 of FIG. 3. The sampling units 90 of FIG. 3 in response to the clock signal C provides a sequence of multibit digital numbers representing successive samples of the envelope at the same rate at which samples are taken on one of the curves of the graph 92. Thus, the input to each of the filter systems 100 is a sequence of multibit digital numbers the magnitudes of which represent the envelope of the input signal for each of the respective channels 98. In view of the fact that in a matched filtering operation the impulse response must be a mirror image of the input data train, the sequence of samples entering each of the filters 100 is rearranged in reverse order by means of a deltic loop (to be described with reference to FIG. 5) to provide this mirror image relationship. It is furthermore apparent from a study of FIG. 1 that the shape and duration of each received echo depends on the distance of the point of reflection from the ship 20 and furthermore on the angle of incidence of each of the respective beams 30 on the sea bottom 28. Accordingly, to provide the desired matched filtering operation, a set of filter coefficients to cover each situation of range and angle of incidence is provided by the memory 106.

It is noted that the angle of incidence of a beam 30 upon the bottom 28 of FIG. 1, as measured between a normal to the bottom 28 and the beam 30, is equal to the angle $\alpha$ when the bottom 28 is level. However, when the bottom 28 is inclined the foregoing angle relationship is retained if the angle $\alpha$ is measured relative to a beam inclined to the vertical. Thus it is seen that by simply rotating the frame of reference of the set of beams 30, a proper set of filter coefficients is obtained for the situation in which the bottom 28 is inclined. The processor 68 provides for the inclined situation by applying the bottom slope signal on line 118 to operate the selector switch 108 thereby redirecting the filter coefficients to the several channels 98 so that, for example, a coefficient that previously went to channel number 10 now goes to channel number 11 or number 12.

Different sets of filter coefficients are stored in the memory 106 for differing depths of the ocean. Thus, separate sets may be utilized for depths of, for example, 500 fathoms, 1000 fathoms, 1500 fathoms, and 2000 fathoms. More sets of filter coefficients for greater range precision may be utilized if desired. The address generator 110 in response to a digital number on line 114 representing the depth or minimum slant range of the ocean provides a set of addresses to address the set of filter coefficients of the memory 106. The range track 112 also provides the set of coarse range gates on line 72 for use by the detector system 66. With respect to these range gates, it is noted that it is not necessary to provide an individual gate width and time of occurrence for each of the beams 30, but rather, a geometry of FIG. 1 may be approximated by utilizing one range gate to bracket the expected times of arrivals of echoes on all beams having a relatively small value of the angle $\alpha$, a second gate being utilized for beams having a medium sized angle $\alpha$ and a third gate for all beams having relatively large values of the angle $\alpha$. The range tracker 112 may be a closed loop tracker such as is utilized in modern radar equipment, or may be a simpler device such as a register which is strobed by the signal on line 122 to read the value of range R plus a pulse generator to generate range gate signals of the appropriate width.

Figure 5:
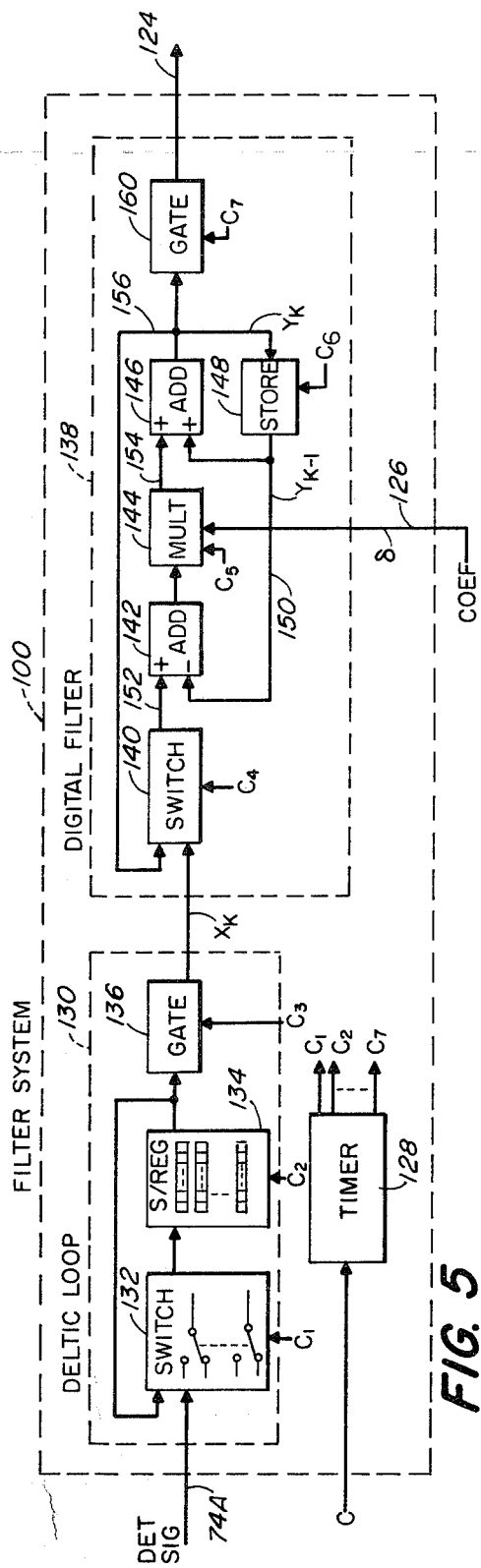
FIG. 5 is a block diagram of a filter system utilized in the signal processor of FIG. 4.

Referring now to FIG. 5 there is shown a block diagram of the filter system 100 which is seen to accept an input signal on line 74a and to provide an output signal on line 124. The filter coefficient is provided along line 126. The filter system 100 comprises a timer 128 operated by clock signals C for producing a set of timing signals C1–C7 for clocking the components of the filter system 100 at a much higher clock rate than the beam scanning or sampling rate. The filter system 100 comprises a deltic loop 130 which includes a switch 132, a shift register 134 and a gate 136. The filter system 100 further comprises a digital filter 138 which includes a switch 140, an adder 142, a multiplier 144, an adder 146 and a storage unit 148. The operation of a deltic loop such as the deltic loop 130 has been disclosed in the U.S. Pat. No. 2,958,039 which issued to V. C. Anderson on Oct. 25, 1960, and provides for the sequential storage of the incoming digital numbers on line 74A into the shift register 134. The shift register 134 is understood to comprise a set of shift registers of equal cell length each of which is clocked by the clock signal C2, one of the shift registers in the set being used for the most significant bit of the digital number on line 74A with other ones of the shift registers in the set of shift registers being used for other bits of the multibit numbers on line 74A. The switch 132 is utilized for recirculating numbers appearing at the output of the shift register 134 to its input. The switch 132 is similarly understood to comprise a set of switches one for each bit of the multibit number to recirculate each of the bits into its respective shift register of the set of shift registers.

The shift register 134 is of sufficient cell length to accommodate digital numbers for as many samples as can be admitted by the range gates 84 of FIG. 3. The clocking rate provided by the clock signal C2 is such that the recirculated bits of one digital number enter the switch 132 immediately after the succeeding digital number on line 74A has been passed by the switch 132 into the shift register 134. The clock signal C1 is synchronized with the system timing pulses C so that the switch 132 is in a position to pass the digital numbers on line 74A as they appear and then to immediately switch over for the feedback loop to recirculate the digital numbers stored within the shift register. In this way the sequence of digital numbers stored within the shift register 134 has a reverse order to the order of appearance of the digital numbers on line 74A. After the number of recirculations has been sufficient to fill the shift register 134 to completion with digital numbers appearing on line 74A, the gate 136 is operated by the clock signal C3 to pass the digital numbers in inverse order to the digital filter 138. In this way, the sequence of digital numbers representing the envelope of the detected signal of FIG. 3 is passed in reverse order to the digital filter 138.

Since, as was disclosed hereinbefore, the impulse response of the digital filter 138 is equal to the shape of the anticipated envelope of the echoes, the signal entering the digital filter 138 from the deltic loop 130 is the mirror image of this impulse response. Accordingly, the filter 138 provides a matched filtering operation of the detected envelope. The number of cells in the shift register 134 is the same for each of the filter systems 100 in the respective channels 98 of FIG. 4 so that a constant system delay is provided for each of these channels with the result that there is no loss in range data because of this inversion operation.

Figure 6:
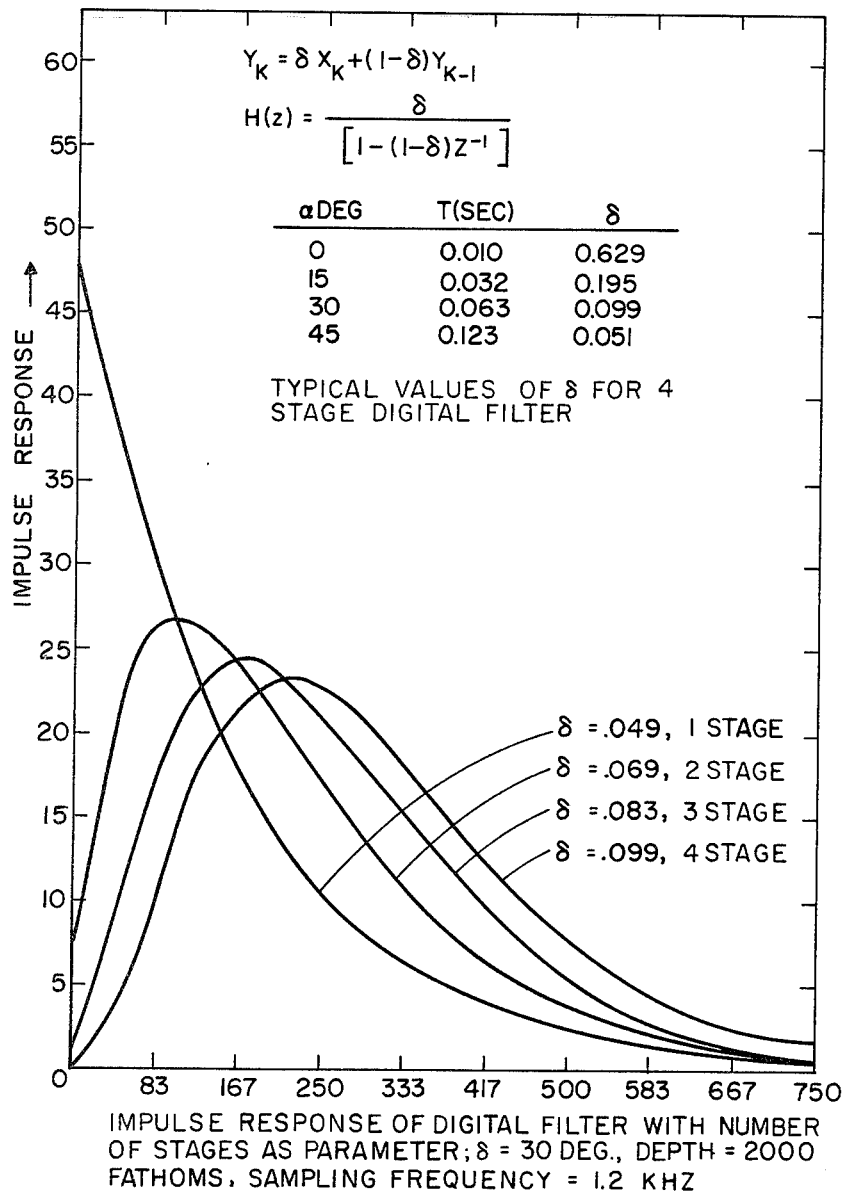
FIG. 6 shows a graph of the impulse response of the filter system of FIG. 5 and further includes the difference equation representing a single stage of the filter and a table of values of the filter coefficient utilized as a function of four specific beam angles.

Referring now to FIGS. 5 and 6, a single stage of the digital filter 138 implements the difference equation shown at the top of FIG. 6 and the Z transform thereof shown directly beneath the difference equation. The digital number from the deltic loop 130 passes through the switch 140 to the adder 142. The adder 142 subtracts out the signal on line 150, this signal being a previously stored digital number obtained from the storage unit 148, from the signal on line 152. The difference between these two signals is then multiplied at the multiplier 144 by the coefficient on line 126, the coefficient being a digital number obtained from the selector switch 108 as explained previously with reference to FIG. 4. The output of the multiplier on line 154 is then summed with the signal on line 150 by the adder 146 to produce a single stage filter output on line 156. With respect to the difference equation in FIG. 6, the input signal X appears on line 158 while the single stage output signal Y appears on line 156. The subscripts K represent the present values of these signals while the subscript K-1 represents a previous value of the Y signal. The filter coefficient on line 126 is represented by the symbol $\delta$.

In operation, therefore, the product of $\delta$ times the present value of X minus the product of $\delta$ times the previous value of Y from the difference equation of FIG. 6 is seen to appear on line 154 of FIG. 5, the difference having been performed by the adder 142 and the multiplication performed by the multiplier 144. The further summation of the preceding value of Y as shown by the difference equation in FIG. 6 is accomplished by means of the adder 146 of FIG. 5. These mathematical manipulations provide the equivalent of a one pole or single stage filter. To provide a multiple pole or multiple stage filter function, the output value of Y on line 156 is applied to the input of the digital filter 138 via the switch 140, the value of Y also being applied to the storage unit 148 which then makes it available as the previous value of Y to the subsequent arithmetic operation. Thus, to implement a four stage filter, the switch 140 is operated by the clock signal C4 to provide three additional passes of the signals appearing on line 156 through the filter. At the conclusion of the total of four passes, a gate 160 passes the signal from line 156 to line 124 from whence it goes to the peak detector 102 of FIG. 4. The signal C4 then operates the switch 140 to admit the next sample, X, of the signal from the deltic loop 130. A further discussion of discrete systems providing the digital filtering such as that of the digital filter 138 as well as a discussion of Z transforms is given in chapter 7 of the book entitled "Analysis of Linear Time-Invariant Systems" by William M. Brown and published by McGraw Hill Book Company in 1963.

The filter output on line 124 for successive values of an impulse applied at the input X are shown in the graphs of FIG. 6. The graphs as shown are obtained by utilizing a successively greater number of stages in the digital filter. These graphs are similar to the anticipated envelope response for signals reflected from the sea bottom 28 of FIG. 1. Four coefficients are also provided for angles $\alpha$ of 0°, 15°, 30°, and 45°, and the vertical depth and digital filter sample frequency as shown in the figure. As was mentioned hereinbefore, the matched filtering occurs by virtue of the reversal of the samples of the input signal by the deltic loop 130 so that signals having the mirror image of the graphs of FIG. 6 pass through a filter whose impulse response is given by the graphs of FIG. 6. This mirror image relationship is further described in section 9.2, correlation being described in section 9.3, of the book entitled "Introduction to Radar Systems" by Merrill I. Skolnik and published by McGraw Hill Book Company in 1962.

Returning to FIG. 4, the peak detector 102 stores the value of the digital number incident thereupon on line 124. The peak detector 102 includes a comparison circuit for comparing succeeding values of the digital number on line 124 and replaces the stored value with a succeeding larger value of digital number if such larger value appears on line 124. Thus, at the conclusion of the range gate, the value stored in the peak detector 102 is the largest digital number, or peak value, of the output of the filter system 100. When the digital number on line 124 is equal to or drops below the value stored in the peak detector 102, the peak detector 102 strobes the register 104 to read the value of R, the range provided by the range counter 56 of FIG. 2. The peak detector 102 is reset by a value of R=0. Thus, the register 104 contains a digital number representing the slant range obtained in the measurement by beam number 1, while the registers 104 of the subsequent channels provide the slant ranges obtained by measurements with the other beams of FIG. 1. These values of slant range are provided to the computer 120 which, as has been mentioned hereinbefore, converts these values of range to slant range, the conversion being based on the geometry of the beam orientation relative to the sea bottom, a specific geometry being predetermined for each of the beams. The output of the computer is then applied to the display 70 in the format described previously with reference to FIG. 1.

Thus, by way of summarizing the embodiment of the invention as represented by the system of FIGS. 1 and 2, it is seen that by use of a fan beam of sonic energy radiated athwartships towards the ocean bottom, a receiving beam former utilizing delay lines may be utilized for forming sequentially several beams in a simple system utilizing a small transducer array or up to 90 beams and more in a complex system utilizing a multi-element array capable of forming many narrow beams with the attendant large number of delay elements in the receiving beam former. Filter coefficients are provided to a matched filter for echoes received on each of the several beams in accordance with the depth of the ocean. The depths measured by data obtained from the several beams is then presented in the form of a map showing depth data along a wide swath of ocean bottom along the ship's track.

Referring now to FIG. 7 there is shown an alternative embodiment of the invention in which a finite amplitude transmission is utilized to provide directive transmission beams towards the sea bottom with echoes being received at a lower frequency equal to the difference between two relatively high frequency sonic radiations of the transmitted beams. Such a transmission system is disclosed in the U.S. Pat. No. 3,824,531 which issued to George M. Walsh on July 16, 1974. This embodiment of the invention is useful in that the finite amplitude transmission permits the generation of narrow low frequency beams of radiation which can be utilized for greater depths than the standard relatively high frequency transmissions customarily utilized for highly directed beams such as beams having a width of approximately 1°.

With reference to both FIGS. 1 and 7, each beam 30 is understood to be composed of sonic radiations at a frequency F1 obtained from oscillator 162 and frequency F1+F2 in which the frequency F2 is obtained from an oscillator 164. The system of FIG. 7 is indicated by the legend 24A and the transducer array is indicated by the legend 26A. The oscillator 162 produces a sinusoidal signal which is passed by delay units 166 to individual elements of the transducer array 26A, these individual elements being tuned to operate at the frequency F1 for generating a beam of sonic energy at the frequency F1, the direction of radiation of this beam being determined by the values of individual ones of the delay units 166 coupled to the respective elements of the array 26A. Similarly, the oscillator 164 provides a sinusoidal signal and frequency F2 which is mixed with the signal at frequency at F1 in the mixer 168, an output of the mixer 168 having the frequency F1+F2 being extracted by a band-pass filter 170 having a bandwidth sufficiently narrow to exclude other components of the mixing operation. The output of the filter 170 is applied to a phase modulator 172 which modulates the filter output with a signal on line 174 provided by a signal generator 176. The output of the phase modulator 172 is a sinsoid of nominal frequency F1+F2 with a phase modulation in the form of digital phase shifts, for example ±180° phase shifts, which represents the signal of the generator 176, this phase modulated signal apppearing on line 178. The signal on line 178 is passed via delay units 180 to a set of transducer elements of the array 26A which are tuned to radiate sonic energy at the frequency F1+F2. The sonic energy radiations from the transducer array 26A then beam toward a reflecting surface such as the sea bottom 28 of FIG. 1. The sonic radiation at the frequency F1 interacts in a nonlinear fashion with the sonic energy at the frequency F1+F2 to produce sonic energy at the difference frequency F2 which penetrates to much greater depths with less attenuation than does sonic energy at the frequency F1 or F1+F2. Reflected sonic energy at the frequency F2 is received by a receiving transducer 182 (not seen in FIG. 1) which is mounted on the hull of the ship 20 near the array 26A.

The system 24A further comprises the display 70 of the system 24, a clock 184, a steering command unit 186, a range counter 188, and a receiving system 190. The steering command unit 186 provides steering command signals along the lines 192 and 194 to the delay units 166 and 180 in a manner disclosed hereinbefore with respect to the steering command unit 58 and delay units 50 of FIG. 2. Similarly, the clock 184 and the range counter 188 function in a manner similar to the clock 54 and range counter 56 of FIG. 2. In response to signals of the range counter 188 the steering command unit 186 selects delays for sequentially forming beams of the high frequency radiations beginning with a vertically directed beam and continuing with angled beams at successively increasing values of the angle α of FIG. 1. In this respect, it should be noted that the generation of the beams of the system 24A differs from that of the system 24 in that the system 24A provides for a complete transmission of a pulse of sonic energy having a desired duration for suitably illuminating the sea bottom 28, this in contradistinction to the beam steering of the system 24 which rapidly scans each beam 30 to provide many samples of each transmitted pulse. After the completion of each transmission, the increased count of the range counter 188 triggers the steering command unit 186 to select the next beam of sonic radiation. Upon the completion of transmissions of the beams on one side of the ship 20, the steering command unit 186 selects the values of delay for sequentially generating the set of beams on the other side of the ship 20. Energy reflected to the receiving transducer 182 is filtered by filter 196 which has a pass band sufficiently wide to pass modulation at the carrier frequency F2 but sufficiently narrow to reduce sea background noise as well as to attenuate any signals at the frequency F1 and F1+F2.

Upon each selection of delays by the steering command unit 186, a steering command unit 186 provides a digital number on line 198 which designates which beam is being produced. This beam designation signal is applied to the signal generator which in turn generates a coded digital signal suitable for modulation by the phase modulator 172. One form of such coding is disclosed in the U.S. Pat. No. 3,818,478 which issued to Herbert L. Groginsky on June 18, 1974. The digital bits of the signal on line 174 are obtained in synchronism with clocking signals applied by the clock 184 to the signal generator 176. A replica of the signal on line 174 is provided as a reference on line 198 for use in a correlation operation in the receiving system 190.

Referring now to FIG. 8 there is seen a block diagram of the receiving system 190 which comprises a correlator 200, a delay unit 202, a gate 204, a storage system 206, a selector switch 208, and an adder 210. In addition, the receiving system 190 comprises the filter system 100, the peak detector 102, the register 104, the computer 120, the subtracter 116, the memory 106, the address generator 110, and the range tracker 112 which were previously disclosed in FIG. 4. The receiving system 190 accepts the reference signal on line 198, and the R, C, and IN signals seen in both FIGS. 7 and 8.

In operation, the reference signal on line 198 is passed into the storage system 206, the storage system including an address generator which advances the reference signal into the reference terminal of the correlator 200 in response to analogue output signals of the correlator 200 on line 212. Thus, when the reference on line 198 is initially fed from the signal generator 176 of FIG. 7 into the receiving system 190, that portion of the reference which identifies the first beam of the scanning sequence, this being the vertical beam, passes through the storage system 206 into the reference terminal of the correlator 200 while the remaining portion of the reference is held within the storage system 206. As each of the echoes is received by the receiving transducer 182 and the filter 196 of FIG. 7, the modulation on the signals is then correlated with the modulation of the reference to produce a pulse signal on line 212 when the modulation pattern on the received signal matches the pattern of the reference. The pulse on line 212 then triggers the storage system 206 to advance the next portion of the reference having the identifying modulation pattern which identifies the echo transmitted via the second beam 30 of FIG. 1, this being the beam adjacent the vertical beam, whereupon the correlation procedure is repeated as the next echo arrives at the receiving transducer 182.

The correlator 200, as will be explained subsequently with reference to FIG. 9, provides an output on line 214 which is identical to the reference but delayed therefrom, and an output on line 216 which is a set of digital numbers representing the envelope of the correlator output waveform on line 212. At the conclusion of the correlation of a given echo, the pulse signal on line 212 activates the gate 204 to pass the delayed reference to the computer 120. Since the gate 204 is operated at the conclusion of a correlation of an echo with the reference, the delay 202 is used to delay the digital output on line 216 until the delayed reference reaches the computer 120 so that the computer 120 has time to utilize the delayed reference to designate the beam geometry to be utilized in calculating the depth from the slant range. The filter system 100, the peak detector 102 and the register 104 function in the same fashion as was described previously with reference to FIG. 4. In addition, the output of the peak detector is applied directly to the computer as a strobe signal to initiate the calculation of the depth from the slant range which the computer obtains from the register 104. The output of the computer 120 is applied to the display 70 in the manner described previously with reference to FIG. 4.

The bottom slope correction referred to previously with reference to FIG. 4 is implemented in the embodiment of FIG. 8 in a modified fashion due to the fact that the beam scanning in system 24A differs from that of system 24 of FIG. 2. In FIG. 8 the beam designation signal on line 218, in addition to setting up the computer 120 for the depth calculation, is also applied via the adder 210 to the selector switch 208 to provide the appropriate filter coefficient on line 220 to the filter system 100. Herein it is noted that the beam designation signal is in the form of a digital number and that the output of the subtracter 116 on line 222 is a digital number, the former identifying the particular beam while the latter identifies the magnitude of the bottom slope, with the result that their arithmetic combination represents a rotation of the beam coordinate system of FIG. 1, this being the same rotation that was referred to in the discussion of FIG. 4.

It should also be noted that in the embodiment of FIG. 8 only one filter system 100 need be utilized while in the embodiment of FIG. 4 there is one filter system 100 utilized for each of the beams 30 of FIG. 1. The embodiment of FIG. 8 requires only one filter system 100 since each beam is sent out after the preceding ping is completed and, furthermore, since the beam is scanned from a direction of minimum slant ranged to a direction of maximum slant range, the scanning insures that the echoes will be received in the same order as the pings are transmitted. Thus, in order to select the appropriate filter coefficient on line 220 as well as the appropriate geometry for the calculation of the depth by the computer 120, it suffices that the beam designation signal on line 218 be updated after each echo is correlated with the reference. It is noted that the delay 202 also serves a function of insuring that the filter coefficient of the filter system 100 is updated before the digital signal on line 216 reaches the filter system 100. Another distinction between the embodiment of FIG. 8 and that of FIG. 4 relates to the two input signals to the subtracter 116; in the embodiment of FIG. 8 the computer needs to store the maximum slant range signal on the port side of the ship 20 and the maximum slant range signal on the starboard side of the ship 20 in order to accomplish a subtraction of these two signals since they do not occur concurrently but, rather, at the ends of successive scannings of the beam 30. The range tracker 112 responds to the signal on line 212 for tracking the minimum range or depth in a manner analogous to that disclosed in FIG. 4 and, in a corresponding fashion, selects the appropriate program of addresses from the address generator 110 for addressing the set of filter coefficients in the memory 106 corresponding to the minimum depth.

Referring now to FIG. 9 there is seen a diagram of the correlator 200 which comprises two switches 224 and 226, two shift registers 228 and 230, a timer 232 responsive to clock pulses C and having outputs for clocking the switches 224 and 226 and the shift registers 228 and 230, a coincidence detector 234, a delay unit 236, a low pass filter 238, and an analogue-to-digital converter 240. This form of correlator is known as a deltic loop correlator and is described in the U.S. Pat. No. 3,786,405 which issued to W. L. Konrad and M. A. Chramiec on Jan. 15, 1974. The input signal is first passed through a limiter 242 which converts the sinusoid to a trapezoidal or square wave. The output of the limiter on line 244, in view of the phase modulation by the modulator 172 of FIG. 7, may be regarded as a phase modulated square wave. The phase modulation has the coding representing a digital word which identifies the particular beam used for transmission. The reference signal contains a similar phase-modulated code word. The reference signal is loaded by the switch 226 into the shift register 230 wherein it is made to recirculate via the switch 226 at a sufficiently high rate such that there is a complete recirculation per period of the input signal. The input signal is also made to recirculate through the shift register 228 via the switch 224. The length of the shift register 228 differs by 1 cell from the length of the shift register 230 so that the two recirculations precess relative to each other. Coincidences in the output of the shift registers 228 and 230 of the logic levels 1 or 0 produce an output from the coincidence detector 234 having a logic level of 1. Since the correlator 200 is a one bit correlator, the output of the coincidence detector 234 with the subsequent filtering thereof by the low pass filter 238 is indistinguishable from that of a one bit correlator employing true multipliers. The output of the low pass filter 238 has an envelope equal to the correlation function. This output is referred to as the analogue output. The analogue output is fed through an analogue-to-digital converter 240 to convert the analogue output to a digital output which comprises a series of multibit digital numbers occurring at the clock rate C and having magnitudes equal to samples of the envelope function. The output of the shift register 230 is also provided by a delay unit 236 having a magnitude of delay equal to the delay of the coincidence detector 234 and low pass filter 238 so that the delayed reference on line 214 of FIG. 8 is available for being passed through the gate 204 in response to the analogue output on line 212 of FIG. 8.

By way of summary, the embodiment of the invention shown in FIG. 7 permits implementation of the invention with a finite amplitude beam steering transmitting array such that the individual beams are coded for identification of received echoes at the difference frequency. The coding on the individual echoes plus their timing for sequential arrival at the receiving transducer permits individual selection of filter coefficients to provide a matched filtering operation on the envelope of each individual echo. Thereby the elongation of the echo due to oblique incidence of the transmitted sonic energy upon the ocean bottom is transformed to a relatively narrow pulse which gives a greatly increased accuracy and precision to the successive range measurements to provide a more rapid and more accurate mapping of the ocean bottom. The beam identification is applied to the transmitted energy by means of a phase modulation, and the received signal is identified by means of a deltic correlator in which a phase modulated reference having the identifying modulation is correlated with the received echo.

The FIGS. 10-14 relate to further embodiments of the system 24 previously disclosed in FIGS. 1-6.

Referring now to FIG. 10 there is seen an alternative embodiment of the signal processor 68 previously described in FIG. 4, this embodiment being identified by the legend 68A. The signal processor 68A is seen to comprise N channels identified by the legend 98A which differs from the channels 98 of FIG. 4 in that a correlator 246 is utilized in place of the filter system 100 of FIG. 4. The embodiment of FIG. 10 is seen to comprise the selector switch 108, the range tracker 112, the subtracter 116, and the computer 120 as disclosed previously with reference to FIG. 4. The signal processor 68A further comprises a set of envelope generators 248, there being one envelope generator 248 for each of the channels 98A, each envelope generator 248 being individually coupled via the selector switch 108 to its corresponding channel 98A. Each envelope generator 248 is seen to comprise a data preparer 250, a memory 252 and an address generator 254. The memory 252 stores sequences of multibit digital numbers, each number representing the magnitude of a point of the anticipated envelope of reflected echoes as portrayed in FIG. 1. A sequence of these digital numbers is fed along line 256 to the reference input of the corresponding correlator 246 to be correlated against the multibit digital numbers, such as those appearing on line 74A, of the detected signal to provide a relatively narrow pulse on line 124 similar to that produced on line 124 of FIG. 4 by the filter system 100. Thus, the essential difference between the embodiment of FIG. 10 and the embodiment of FIG. 4 is that a correlator is utilized in FIG. 10 rather than the matched filter of FIG. 4 to transform the elongated echo envelope of FIG. 1 to a relatively narrow pulse signal. The address generator 254 of FIG. 10 functions in a manner analogous to the address generator 110 of FIG. 4 to select the sequence of digital numbers in the memory 252 in response to a signal on line 258 representing the minimum slant range as provided by the range tracker 112. The data preparer 250, to be described with reference to FIG. 11, is utilized for developing the sequence of digital numbers and for placing these sequences into the memory 252.

Referring now to FIG. 11, the data preparer 250 is seen to comprise a switch 260, a programmer 262 for operating the switch 260, a set of shift registers 264 an adder system 266 for sequentially adding together the outputs of each of the shift registers 264 to provide on line 268 the sum of digital numbers stored in corresponding cells of the shift registers 264, a digital-to-analogue converter 270, a low pass filter 272, a sampler 274 which includes an analogue-to-digital converter, a timer 276 responsive to clock pulses C for driving the adder system 266 and the sampler 274, and a register 278 for storing the digital numbers provided by the sampler 274 so that these numbers may later be read out along line 280 into the memory 252 of FIG. 10. While it is understood that sequences of digital numbers may be built into the memory 252 as is done in the case of a read-only-memory, the data preparer 250 presents a more flexible system in which the sequences of digital numbers stored in the memory 252 may be altered in accordance with data received from the sea bottom 28 of FIG. 1 during an actual mapping run made by the ship 20. A gate 282 in response to a tracking gate provided by the range tracker 258 inhibits detected signals on line 74A from entering the switch 260 except for such signals as occur during the interval bracketed by the range gate. Since each data preparer 250 receives its input from a corresponding channel of the detector system 66 of FIG. 3, the data passing through the switch 260 of FIG. 11 relates to echoes received on a specific beam 30 of FIG. 1 and at a specific depth of the sea bottom 28.

The programmer 262 activates the switch 260 for selected pingings of the system 24 of FIG. 1. Thus, for example, when the value of R is equal to 0 the programmer 262 may activate the switch 260 to couple the gate 282 to the upper shift register 264, and then, at a time subsequent to several pings, which time is determined by counting several occurrences of R=0, activates the switch 260 to couple the gate 282 to the next shift register 264. Thereby, at various times during the traveling of the ship 20 over a specific portion of the ocean bottom, a sample of the echo envelope is stored in a shift register 264. For example, there may be twenty shift registers 264 each of which stores a separate sample of a received echo envelope. At a specific instant of time designated by the programmer by a signal on line 284 the timer 276 activates the adder system 266 to sum together the digital numbers appearing in the last cell of each of the shift registers 264, whereupon, in response to clock signal C8 of the timer 276 the digital numbers in the next to the last cell in each of the shift registers 264 is advanced to the adder system 266 to be summed together. It is understood that each cell in the shift register is actually a multiplicity of cells and that each shift register 264 is in fact several shift registers in parallel to accommodate each bit of the multibit numbers along line 74A. Such an arrangement was mentioned previously with reference to FIG. 5 and will also be referred to subsequently with respect to FIG. 12.

In operation, therefore, selected echoes received from the sea bottom 28 of FIG. 1 are, after having been converted to a sequence of multibit digital numbers by the sampling unit of FIG. 3, admitted to successive ones of the shift registers 264 wherein they are stored until each of the shift registers 264 is filled with echo envelope data. Then, in response to signals of the timer 276, the data in the shift registers 264 is advanced cell by cell into the adder system 266 which presents on line 268, apart from a scale factor, a sequence of multibit digital numbers representing the average values of samples of received echo envelopes. The digital numbers on line 268 are then converted by the digital-to-analogue converter 270 to a sequence of analogoue pulses each of which has an amplitude proportional to the value of the digital number, these analogue pulses then being smoothed by the filter 272. The cutoff frequency of the low pass filter 272 is sufficiently high to pass the significant spectral components of the echo envelopes but low enough to filter out the sampling frequency of the sampling unit 90 of FIG. 3 so that smooth analogue outputs as shown in the graph 286 appear at the output of the filter 272. The smoothed output of the filter 272 is then again sampled by the sampler 274 to reconvert the analogue signal of the filter 272 to the multibit digital numbers which are to be stored in the register 278. It is noted that the curves of the graph 286 have been given a more wavy shape than the envelope shapes portrayed in FIG. 1 to demonstrate another feature of the data preparer 250, that is, that by broadening out a range gate provided by the range tracker 112 on line 258, not only the echo envelope data is stored in the shift registers 264 but also reverberation data prior to and subsequent to an echo may be stored so that, the memory 252 can actually provide a reference signal for the correlator 246 of FIG. 10 which is based on reverberation history as well as echo history. The use of the reverberation history in the correlation operation permits the system 24 of FIG. 2 to be much more versatile in that mappings can be obtained of thermoclines and other reflecting boundaries and, furthermore, mappings can be taken of a sea bottom which has undulations rather than simply the smooth sea bottom 28 of FIG. 1.

Figure 12:
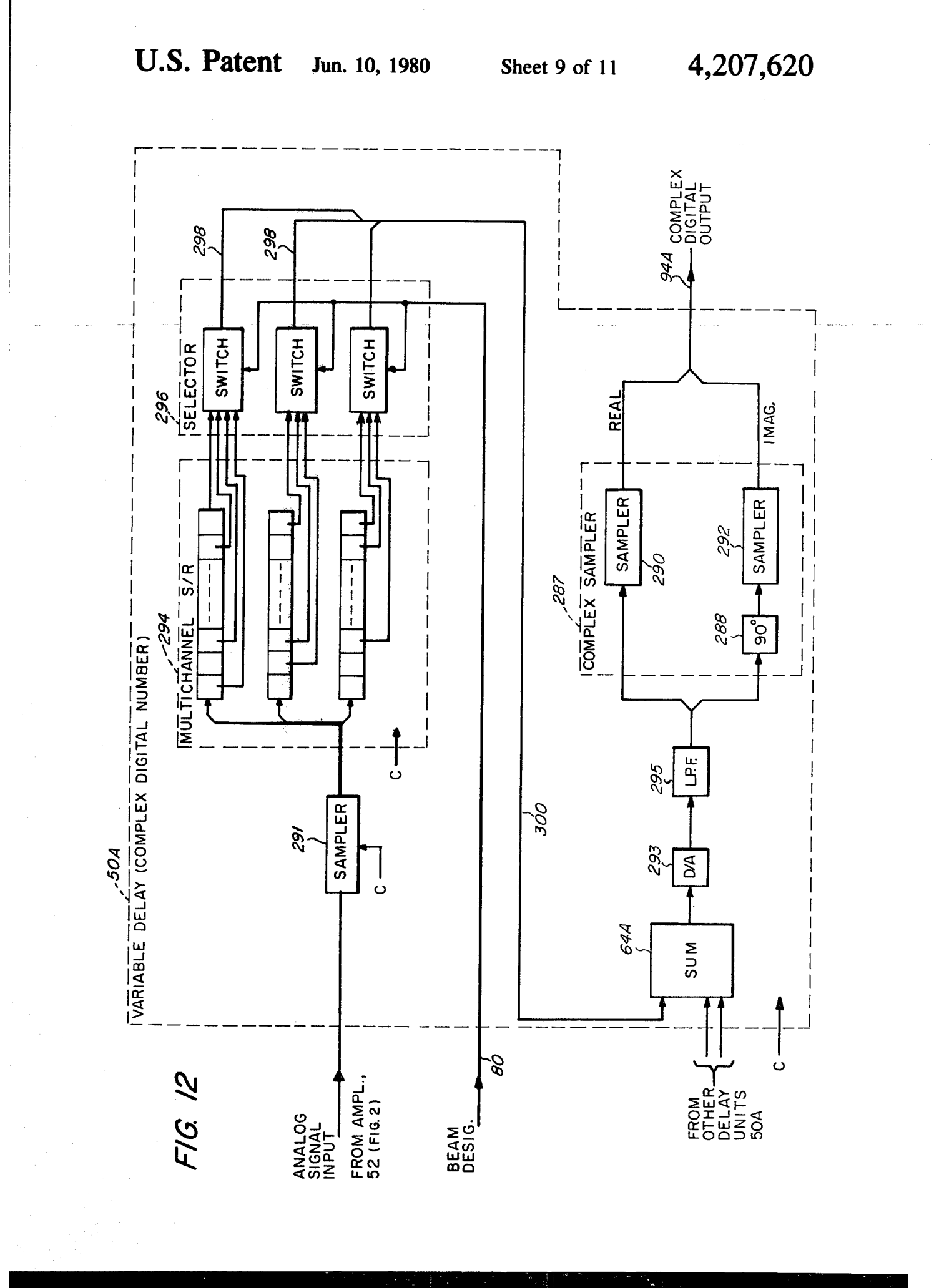

Referring now to FIG. 12 there is shown an alternative embodiment of the variable delay units 50 of FIG. 2, this embodiment being identified by the legend 50A. In view of the fact that is it often difficult to obtain lengthy delays by means of analogue delay lines, such lengthy delays being characteristic of long sonar transducer arrays, a digital variable delay line such as that of the delay unit 50A may be utilized. The delay unit 50A includes at its output a complex sampler 287 which comprises a 90° phase shifter 288 and two samplers 290 and 292, the sampler 290 providing inphase sampling and the sampler 292 providing quadrature sampling, both samplers including analogue-to-digital converters operated by the clock signal C to provide multibit digital numbers representing the magnitudes of the inphase and quadrature samples. The sampling rate of each sampler 290 and 292 is greater than the modulation spectrum of the received echo with the combined sampling rate of the two samplers 290 and 292 being greater than twice the signal data rate, or nyquist rate, to insure an accurate reproduction of the signal data. The delay unit 50A further comprises a second sampler 291 at its input, a digital-to-analog converter 293, a multichannel shift register 294, a low-pass filter 295, and a multi-channel selector switch 296. The sampler 291 functions in the same manner as the sampler 290 but operates at more than twice the carrier frequency of the input signal. A switch in each channel of the selector switch 296 is coupled to its corresponding cells of a shift register in the corresponding channel of the multi-channel shift register 294 so that by appropriate activation of the selector switch 296 by the beam designation signal from the steering command unit 58 of FIG. 2, the signals from a set of cells of the multibit shift register 294 are coupled to corresponding output lines 298 to provide on the output cable represented by line 300 multibit digital numbers representing inphase and quadrature components of the analogue input signal. The beam steering function is accomplished with the delay units 50A in the same fashion as with the delay units 50 since, by selecting the appropriate set of cells of the multibit shift register 294, the time required to clock the digital numbers down the shift register in response to the clocking signal C provides the same magnitude of delay which was described previously with reference to FIG. 2. The interconnection of the shift register 294 and the selector switch 296 is similar to that referred to earlier in the filter system 100 of FIG. 5 since individual channels of the multibit shift registers are utilized for individual bits of the digital numbers.

The output of the delay unit 50A on line 300 is applied to a summer identified by the legend 64A which functions in the same fashion as does the summer 64 of FIG. 2 except that the summer 64A adds together digital numbers rather than the summing together of the analogue signals as done by the summer 64 of FIG. 2. The multibit combining by the summer 64A of the signals of the delay units 50A provides an accurate combination of the delayed signals for precise beam forming. The output of the summer 64A is converted to an analog signal by the digital-to-analog converter 293 and low pass filter 295 which has a cut-off frequency high enough to pass the signal modulation, but low enough to remove the sampling frequency. The output of the filter 295 is then converted to real and imaginary digital numbers by the complex sampler 297 which is coupled via line 94A to the detector system of FIG. 13.

Figure 13:
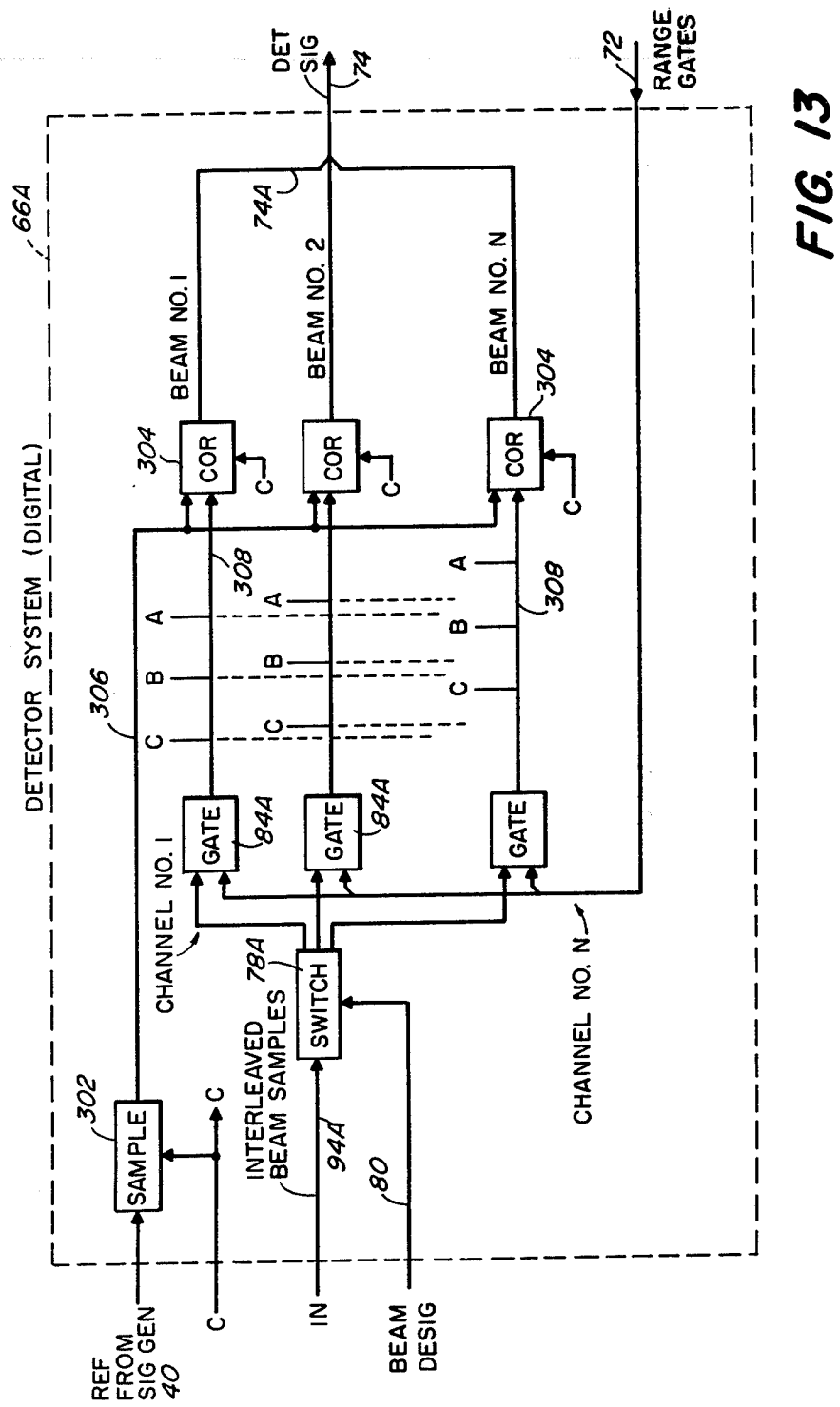
FIG. 13 is a block diagram of an alternative embodiment of the detector system of FIG. 3.
Figure 14:
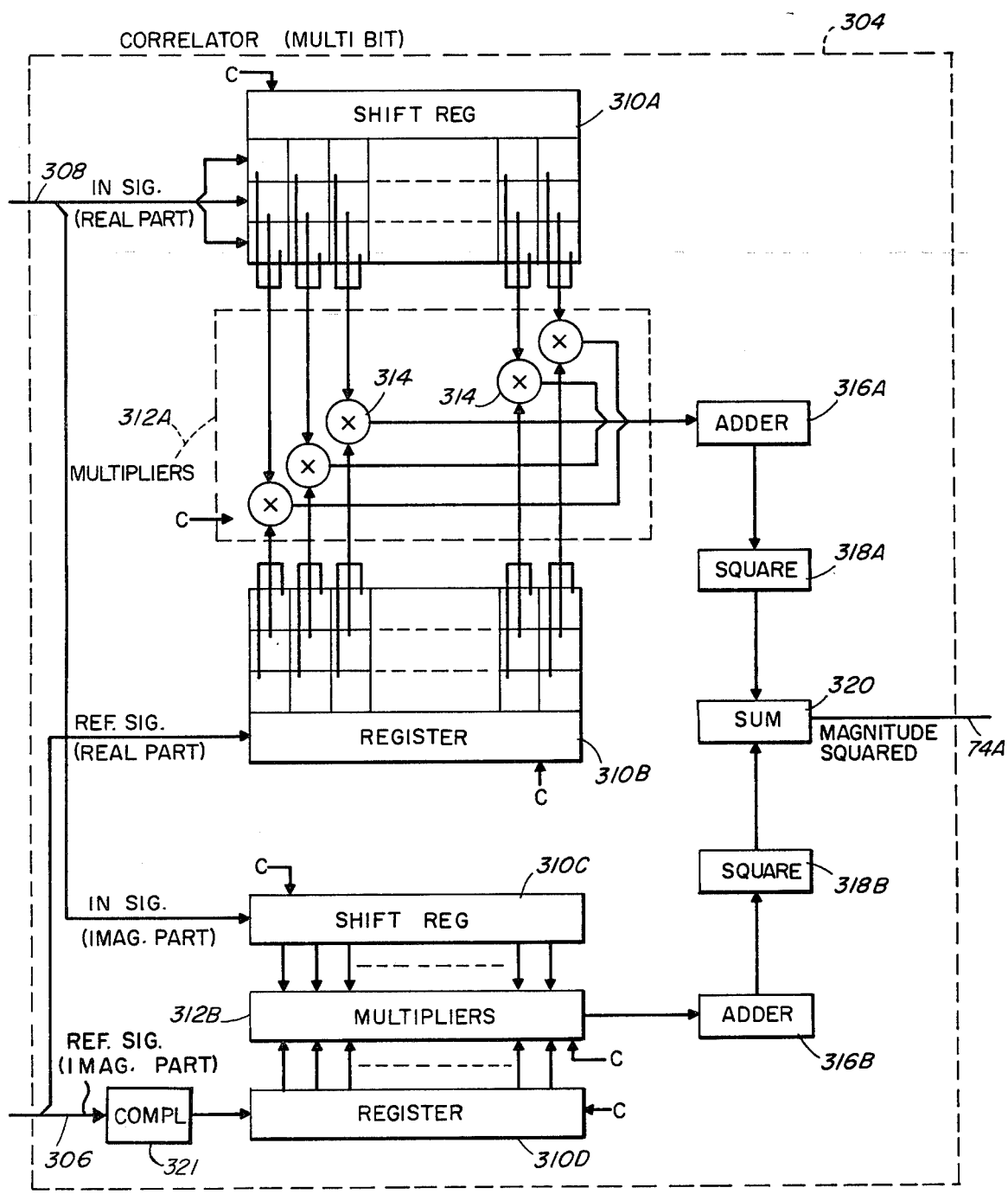
FIG. 14 is a block diagram of a complex correlator for use in the detector system of FIG. 13, the real portion of the correlator of FIG. 14 being suitable for use in the signal processor of FIG. 10.

Referring now to FIG. 13 there is shown a detector system 66A which is an alternative embodiment of the detector system 66 previously disclosed with reference to FIG. 3. The detector system 66A is seen to comprise a sampler 302, a switch 78A analogous to the switch 78 of FIG. 3, gates 84A analogous to the gates 84 of FIG. 3 and correlators 304 which take the place of the filters 86, envelope detectors 88 and sampling units 90 of FIG. 3. The detector system 66A is to be used with the digitally formated signals obtained from the delay unit 50A and, accordingly, the line 94A carries the delayed beam samples in which each sample is represented by a pair of multibit digital numbers for the real and inphase component of the sample. The gates 84A are multichannel gates for each of the bits of the pair of digital numbers of each signal sample. The pair of digital numbers may be regarded as a complex number in which the real part corresponds to the inphase component while the imaginary part corresponds to the quadrature component. The correlators 304, as will be described with reference to FIG. 14, provide correlation with complex numbers by correlating the real part of the signal with the real part of the reference and the imaginary part of the signal with the imaginary part of the reference and then combining the two resulting signals. The sampler 302 provides inphase and quadrature samples of a reference signal obtained from the signal generator 40 of FIG. 2, this reference being a replica of the transmitted signal. The operation of the sampler 302 is similar to that described previously with reference to the pair of samplers 290 and 292 in cooperation with the phase shifter 288 of FIG. 12.

In operation, therefore, the multichannel switch 78A and the multichannel gates 84A function in a manner analogous to the switch 78 and gates 84 of FIG. 3 to steer the samples of the respective beams falling within the respective range gates into the respective channels 1-N. In a manner analogous to that portrayed by the graph 92 of FIG. 3, successive samples obtained on each of the beams 30 of FIG. 1 are shown by the letters A, B and C in each channel of the detector system 66A. Thus, sample A of beam 2 occurs shortly after sample A of beam 1 while a relatively long delay is present between sample A of beam 2 and sample A of the Nth beam. Similar comments occur to the next scanning of the beam ordered by the steering command unit 58 of FIG. 2, the next series of samples being represented by the letter B in each of the channels and the succeeding series of samples being represented by the letter C.

These samples then feed into the correlators 304 at the system clocking rate whereupon they are correlated against the sequence of samples of the reference on line 306. The output signals of the correlators 304 are digital numbers similar to those provided by the sampling units 90 of FIG. 3, these outputs appearing in the table represented by the lines 74 with one such output corresponding to beam number 1 appearing on line 74A of the output cable.

Referring now to FIG. 14 there is shown a diagram of the correlator 304 of FIG. 13. The input signal is shown on line 308 while the reference signal appears on line 306. The correlator 304 comprises four multibit shift registers 310A-D, two multiplier systems 312A-B each of which comprises multiplying units 314, adders 316A-B, squaring units 318A-B, a summer 320 and a complimenting circuit 321. The digital numbers representing the real part of the input signal are clocked into the shift register 310A with individual bits of the digital number going into corresponding channels of the shift register 310A. Similar comments apply to the digital number representing the imaginary part of the input signal which are clocked into the shift register 310C. In a similar manner, the real and imaginary parts of the reference signal are clocked into the shift registers 310B and 310D. The sign (±) of the imaginary part is changed by the complimenting circuit 321 at the input to the shift register 310D to provide the complex conjugate of the reference signal. It is noted that if the reference signal is invariant from ping to ping, then the reference signal need be placed in the shift registers 310B and 310D only once, in which case simply a register may be utilized instead of the shift register. As each successive sample of the input signal reaches the correlator 304, it is shifted down the shift registers 310A and 310C cell by cell until the shift register is filled. Each of the multiplying units 314 is a multibit multiplier which connects with the successive cells containing the individual bits of the digital numbers stored in the shift registers 310A-D. The correlator 304 performs a true correlation by multiplying together the samples of the input signal against each of the samples of the reference signal as the input signal is clocked through the shift registers while the reference signal remains stationary in its shift registers. (The reference signal is not clocked through the shift registers during the correlation operation, it is entered at the time of the pinging and remains there until after the correlation operation is completed. In a typical system the contents of the reference registers 310B and 310D will remain unchanged during the mapping operation by the ship 20 of FIG. 1). The output of the multiplying units 314 are added to each other by the adders 316A and 316B, the outputs of the adders 316A-B being squared respectively by the squaring units 318A-B and then summed together by the summer 320. The output of the summer 320 represents the sum of the squares of the real and imaginary parts of the correlation, this being equal to the squared magnitude of the complex correlation. As a practical matter, the squared magnitude is just as useful a signal to operate with as is the true magnitude of the complex correlation so that there is no need to take the square root of the output of the summer 320. The output of the correlator for beam 1 of FIG. 13 is on line 74A, that legend also seen in FIG. 14. It is also interesting to note that the correlator 246 disclosed in FIG. 10 may be contructed in a manner similar to that of the correlator 304 except that only the real portion is utilized, namely the shift registers 310A and 310B along with the multiplying system 312A and the adder 316A; the other components such as the squaring units 318A and the summer 320 are not required.

It is understood that the above described embodiments of the invention are illustrative only and that modification thereof may occur to those skilled in the art. Accordingly, it is desired that this invention is not to be limited to the embodiments disclosed herein but is to be limited only as defined by the appended claims.

What is claimed is:

1. An oceanographic mapping system comprising: means coupled to a medium for receiving radiant energy which propagates through said medium from points of a reflective interface;
   means coupled to said receiving means for segregating signals of said radiant energy as a function of the positions of said interface points relative to said receiving means;
   means coupled to said segregating means for comparing points of the envelopes of said segregated signals with a set of reference points, said comparing means including reference means for providing signals representing said set of reference points; and
   means coupled to said comparing means for providing a map of said interface points.

2. A system according to claim 1 wherein said comparing means comprises means for correlating said points of said envelopes of said segregated signals with said set of reference points.

3. A system according to claim 2 wherein said comparing means further comprises means for generating replicas of anticipated envelopes of said segregated signals, means for storing said replicas, and means for coupling individual ones of said replicas from said storing means to said correlating means in accordance with the positions of said interface points.

4. A system according to claim 3 wherein said replica generating means comprises means for storing preselected members of a sequence of said segregated signals, means for averaging said stored preselected members to provide an average signal, and means for filtering said average signal to provide an individual one of said replicas.

5. A system according to claim 1 wherein said receiving means comprises an array of transducer elements and delay means coupled to individual ones of said transducer elements, and wherein said segregating means comprises means coupled to said delay means for selecting the amount of delay in each of said delay means, said delay means delaying signals received by corresponding ones of said transducer elements, means for summing together signals delayed by said delay means, a plurality of signal detector means of which individual ones of said detector means corresponds to individual directions of said sources relative to said receiving means, and means for selectively switching said combined signals to individual ones of said detecting means, said switching means and said delay selecting means being coupled for synchronous operation.

6. A system according to claim 5 wherein said delay selecting means varies said delay in each of said delay means in accordance with a preset pattern to provide a scanning of received beams of said radiant energy.

7. A system according to claim 6 wherein said scanning by said delay selecting means is accomplished at a rate higher than the bandwidth of said signals of said received radiant energy.

8. A system according to claim 1 further comprising means for radiating said radiant energy into said medium, said radiating means directing said radiant energy toward said interface points, said interface points reflecting energy incident thereupon from said radiating means.

9. A system according to claim 8 wherein said radiating means comprises an array of transducer elements, signal generator means for generating signals at a plurality of frequencies, delay means coupling said signal generating means with individual ones of said transducer elements, said delay means delaying signals of said signal generating means for forming directive beams of radiant energy from said array of transducer elements, said beams of said radiant energy propagating through said medium at said plurality of frequencies and providing a nonlinear interaction within said medium to provide radiation at a frequency different from said plurality of frequencies, said beam of radiation at said different frequency propagating towards a reflecting surface within said medium containing said interface points.

10. A system according to claim 9 wherein said segregating means includes means for selecting the amount of delay in each of said delay means to provide a scanning of said energy at said different frequency, the direction of said scanning being from a minimum distance between said radiating means and said interface points through a maximum distance between said radiating means and said interface points, said interface points being positioned on said reflecting surface for reflecting said radiant energy at said different frequency towards said receiving means, and means for sequentially detecting said received signals of radiant energy in correspondence with said scanning.

11. A system according to claim 10 wherein said radiating means includes means synchronized with said delay selecting means for encoding a signal of said signal generating means with data identifying a direction of scanning of radiant energy of said signal, said segregating means including means for decoding signals of said received radiant energy to extract said data of said scanning direction.

12. A system according to claim 11 wherein said signal generating means provides a reference of a signal at said different frequency, and wherein said segregating means includes a correlator for correlating signals of said received radiant energy with said reference.

13. A system according to claim 9 wherein said signal generating means includes timing means coupled to said mapping means, and said mapping means being responsive to said envelope comparison for providing the ranges of said interface points, said mapping means further comprising computer means for computing the depths of said interface points from said ranges of said interface points and the directions of radiation radiated by said array of transducer elements.

14. A system according to claim 13 wherein said mapping means includes means for comparing the range of one of said interface points with the range of a second of said interface point, and wherein said envelope comparing means comprises means responsive to said comparison of interface point ranges by said mapping means for altering a relationship of said reference points to points of said envelope in accordance with a difference of slope of said reflecting surface relative to a top surface of said medium.

15. An aceanographic mapping system comprising:
means coupled to a medium for receiving radiant energy which propagates through said medium from points of a reflective interface;
means coupled to said receiving means for segregating signals of said radiant energy as a function of the positions of said interface points relative to said receiving means;
means coupled to said segregating means for providing a matched filtering of the envelopes of said segregated signals; and
means coupled to said matched filtering means for providing a map of said interface points.

16. A system according to claim 15 wherein said matched filtering means comprises means for providing sets of sequences of coefficients for said matched filtering means, means for storing sets of sequences of said coefficients for said matched filtering means, individual coefficients of said sequences of coefficients corresponding to the angular orientation of said interface points relative to said receiving means, individual sequences of said sets of sequences corresponding to the distances of said interface points relative to said receiving means, said matched filtering means including means for multiplying signals by said coefficients, and means for coupling individual coefficients of said sequences for said storing means to said multiplying means of said matched filtering means in correspondence to said angular orientations.

17. A system according to claim 16 wherein said matched filtering means further comprises means for addressing said storing means for coupling individual ones of said sequences to said multiplying means of said matched filtering means in correspondence with said distances of said interface points, and means coupled to said addressing means of said matched filtering means for measuring said distances.

18. A system according to claim 17 wherein said matched filtering means comprises means for reordering samples of said segregated signals, means for coupling said reordered signals to said means for multiplying signals by said coefficients, said multiplying means operating on said reordered signal samples to provide a resultant signal, and means for arithmetically combining said resultant signal with one of said reordered signal samples.

19. A mapping system comprising:
means for scanning a beam of finite amplitude sonic radiation through a medium towards a boundary of said medium;
means coupled to said scanning means for modulating said radiation with a signal representing a direction of said radiation propagation;
means responsive to radiation reflected from said boundary and responsive to said modulation for providing a set of signals representing filter coefficients based on an anticipated envelope of said reflected radiation; and
means coupled to said coefficient signal providing means and responsive to said reflected radiation for filtering samples of said reflected radiation, the response of said filtering means being matched to said anticipated envelope.

20. A system according to claim 19 further comprising means coupled to said filtering means and to said scanning means for measuring range to points of reflection on said boundary, said measuring means including means for calculating the distances between said points of reflection and a surface of said medium.

21. A system according to claim 20 further comprising means for transporting said scanning means along said medium in a direction normal to said scanning.

22. In combination:
means traveling along the surface of a medium for receiving echoes emanating from a reflecting boundary of said medium;
means for directing radiant energy into said medium to provide said echoes;
means for storing a plurality of said received echoes;
means for averaging said echoes of said storage means; and
means coupled to said receiving means and to said averaging means for correlating received echoes with said averaged echo.

23. A combination according to claim 22 further comprising means coupled to said correlating means and to said energy directing means for displaying a map of depths of said medium.

24. In combination:
means for receiving radiant energy propagating through a medium;
means for generating said radiant energy and a replica of a signal of said received radiant energy;
means coupled to said receiving means and to said replica generating means for correlating said signal of said received radiant energy with said replica;
means for generating a replica of an envelope of said signal of said received radiant energy as distorted by said medium; and
means coupled to said correlating means and to said envelope replica generating means for comparing said correlated signal with said envelope replica.

25. A combination according to claim 24 wherein said receiving means includes means for complex sampling of said signal of said received radiation, said correlation is a complex correlation, and said comparing means provides a correlation of said correlated signal with said envelope replica.

26. A combination according to claim 24 wherein said comparing means provides a matched filtering operation of said correlated signal with said envelope replica, said replica generating means providing a set of filter coefficients representative of said envelope for performing said matched filtering.

27. In combination:
means for directing finite amplitude sonic radiation in a plurality of directions, said directing means providing a reference signal indicating said directions;
means for receiving said sonic radiation;
means coupled to said receiving means and to said directing means for measuring elapsed time of propagation of said sonic radiation from said directing means to said receiving means, said elapsed time measuring means providing elapsed time measurements for radiations in a plurality of said directions;
means for comparing said elapsed time measurements for said plurality of directions;
means coupled to said receiving means for filtering signals of said received radiation, a filter coefficient of said filtering means being selected in accordance with data of said reference signal; and
means coupled to said comparing means and to said filtering means for altering said filtering characteristic in accordance with a magnitude of a comparison provided by said comparing means.

28. A combination according to claim 27 further comprising means coupled to said time measuring means and responsive to a measurement of said elapsed time for varying said filtering characteristic.

29. A combination according to claim 28 wherein said filtering means is a digital filter, said digital filter including a multiplying means, and wherein said filtering characteristic is a multiplier used by said multiplying means in multiplying a signal incident upon said filter.

30. A mapping system comprising:
means for transmitting radiant energy in a plurality of directions toward a reflecting surface;
means for receiving radiant energy reflected from said reflecting surface;
means coupled to said receiving means for comparing a signal received from one point of said reflecting surface with a signal received from a second point of said reflecting surface;
means coupled to said transmitting means and to said receiving means for processing signals received by said receiving means, said processing means comprising means for providing signals representing reference points and means for comparing a set of said reference points with points of said received signal, said processing means further comprising means coupled to said first mentioned comparing means for altering said set of reference points in accordance with the comparison made by said first mentioned comparing means; and
means coupled to said processing means for providing an array of signals representing data of said reflecting surface.

31. A system according to claim 30 wherein the comparing of said first mentioned comparing means is a subtraction operation.

32. A system according to claim 31 wherein said comparing of said first mentioned comparing means is an averaging operation.

33. An oceanographic mapping system comprising:
means coupled to a medium for receiving radiant energy which propagates through said medium from points of a reflective interface;
means coupled to said receiving means for segregating signals of said radiant energy as a function of the positions of said interface points relative to said receiving means;
means coupled to said segregating means for providing a matched filtering of the envelopes of said segregated signals;
means coupled to said matched filtering means for providing filter coefficients based on anticipated envelopes of said segregated signals; and
means coupled to said filtering means for providing a map of said interface points.

34. A system according to claim 33 wherein said receiving means comprises an array of tranducer elements and delay means coupled to individual ones of said tranducer elements, and wherein said segregating means comprises means coupled to said delay means for selecting the amount of delay in each of said delay means, said delay means delaying signals received by corresponding ones of said tranducer elements, means for summing together signals delayed by said delay means, a plurality of signal detector means of which individual ones of said detector means correspond to individual directions of said sources relative to said receiving means, and means for selectively switching said combined signals to individual ones of said detecting means, said switching means and said delay selecting means being coupled for synchronous operation.

35. A system according to claim 33 further comprising means for radiating said radiant energy into said medium, said radiating means directing said radiant energy toward said interface points, said interface points reflecting energy incident thereupon from said radiating means.

36. A system according to claim 35 wherein said radiating means comprises an array of transducer elements, signal generator means for generating signals at a plurality of frequencies, delay means coupling said signal generating means with individual ones of said transducer elements, said delay means delaying signals of said signal generating means for forming directive beams of radiant energy from said array of transducer elements, said beams of said radiant energy propagating through said medium at said plurality of frequencies and providing a nonlinear interaction within said medium to provide radiation at a frequency different from said plurality of frequencies, said beam of radiation at said different frequency propagating towards a reflecting surface within said medium containing said interface points.

37. A system according to claim 36 wherein said segregating means includes means for selecting the amount of delay in each of said delay means to provide a scanning of said energy at said different frequency between a minimum and a maximum distance of said radiating means to said interface points, said interface points being positioned on said reflecting surface for reflecting said radiant energy at said different frequency towards said receiving means.

* * * * *